US012798158B2

(12) United States Patent
Nielsen

(10) Patent No.: US 12,798,158 B2
(45) Date of Patent: Nov. 17, 2026

(54) MOLD ELEMENT SUPPORT DEVICE FOR A MANUFACTURING ASSEMBLY FOR PREFORM ELEMENTS AND/OR PRECAST ELEMENTS AND/OR PREPACKAGED ELEMENTS, MANUFACTURING ASSEMBLY, AND MANUFACTURING SYSTEM

(71) Applicant: Siemens Gamesa Renewable Energy A/S, Brande (DK)

(72) Inventor: Mogens Nielsen, Aalborg (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 19/136,296

(22) PCT Filed: Nov. 27, 2023

(86) PCT No.: PCT/EP2023/083107
§ 371 (c)(1),
(2) Date: Jun. 6, 2025

(87) PCT Pub. No.: WO2024/132383
PCT Pub. Date: Jun. 27, 2024

(65) Prior Publication Data

US 2026/0200139 A1 Jul. 16, 2026

(30) Foreign Application Priority Data

Dec. 22, 2022 (EP) .................................... 22215946

(51) Int. Cl.
*B29C 33/30* (2006.01)
*B29L 31/08* (2006.01)

(52) U.S. Cl.
CPC .......... *B29C 33/306* (2013.01); *B29C 33/305* (2013.01); *B29L 2031/085* (2013.01)

(58) Field of Classification Search
None
See application file for complete search history.

(56) References Cited

U.S. PATENT DOCUMENTS

2011/0285056 A1* 11/2011 Davideit ............... B29C 33/307 264/299
2012/0131782 A1* 5/2012 Petersen ............... B29C 33/307 29/407.01

(Continued)

FOREIGN PATENT DOCUMENTS

EP 1603723 B1 2/2008
EP 2661357 B1 2/2016

(Continued)

OTHER PUBLICATIONS

PCT International Search Report and Written Opinion of International Searching Authority mailed Feb. 23, 2024 corresponding to PCT International Application No. PCT/EP2023/083107 filed Nov. 27, 2023.

*Primary Examiner* — Mohammad M Ameen

(57) ABSTRACT

Mold element support device (2) for a manufacturing assembly (1) for preform elements (86) and/or precast elements and/or prepackaged elements, in particular for a wind turbine blade, the mold element support device (2) comprising multiple vertical column elements (3, 3') which comprise an upper support portion (10) for carrying a longitudinal mold element (9, 9', 9'', 9''', 9'''') for manufacturing a preform element (86) and/or a precast element and/or a prepackaged element, wherein the column elements (3, 3') comprise a height adjustment device (12) to, in particular individually, adjust the height of the column elements (3, 3'), and the support portions (10) are distance-adjustable at least in a width direction (4) of the mold element (9, 9', 9'', 9''', 9'''') via a positioning device (6), to adapt the mold element (Continued)

Figure 1:
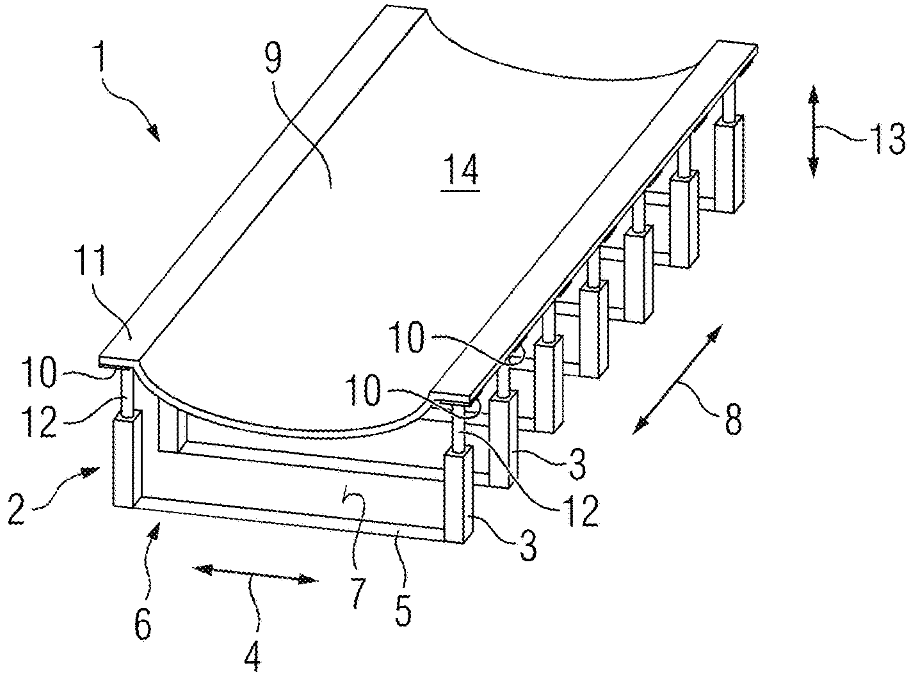

support device (2) to differently shaped and/or sized mold elements (9, 9', 9", 9'", 9"").

15 Claims, 20 Drawing Sheets

(56) References Cited

U.S. PATENT DOCUMENTS

2019/0126566 A1* 5/2019 Lehmann Madsen ........................ B29C 33/307
2021/0387295 A1* 12/2021 Henrichsen ............. B23P 15/04

FOREIGN PATENT DOCUMENTS

| | | | |
|---|---|---|---|
| EP | 2362824 | B1 | 4/2016 |
| EP | 3102396 | A1 | 12/2016 |
| EP | 2731772 | B1 | 6/2017 |
| EP | 3018342 | B1 | 1/2018 |
| EP | 4183543 | A1 | 5/2023 |
| WO | 2019115337 | A1 | 6/2019 |
| WO | 2019115522 | A1 | 6/2019 |
| WO | 2019145240 | A1 | 8/2019 |
| WO | 2020178387 | A1 | 9/2020 |
| WO | 2021223887 | A1 | 11/2021 |
| WO | 2022049179 | A1 | 3/2022 |

* cited by examiner

MOLD ELEMENT SUPPORT DEVICE FOR A MANUFACTURING ASSEMBLY FOR PREFORM ELEMENTS AND/OR PRECAST ELEMENTS AND/OR PREPACKAGED ELEMENTS, MANUFACTURING ASSEMBLY, AND MANUFACTURING SYSTEM

The invention concerns a mold element support device for a manufacturing assembly for preform elements and/or precast elements and/or prepackaged elements, in particular for a wind turbine blade, the mold element support device comprising multiple vertical column elements which comprise an upper support portion for carrying a longitudinal mold element, in particular a mold shell, for manufacturing a preform element and/or a precast element and/or a prepackaged element. Further, the invention concerns a manufacturing assembly for preform elements and/or precast elements and/or prepackaged elements, in particular for a wind turbine blade, comprising such a mold element support device, and a manufacturing system.

Wind turbines usually comprise a rotor having multiple wind turbine blades. For example, such a wind turbine may convert the mechanical energy of the wind into electrical energy. Since large-scale energy production is sought, the wind turbines and, accordingly, the wind turbine blades have an enormous size, such that their manufacturing is a major challenge for manufacturers of wind turbines. While, for a long time, wind turbine blades have been fabricated from fiber-reinforced material involving the handling of large parts like fiber mats by casting the shell of the wind turbine blade, technologies have been proposed to facilitate manufacturing of wind turbine blades.

For example, it has been proposed to use preform elements, or preforms, respectively. Such preform elements are preformed smaller parts or segments of the wind turbine blade, which are used for building the respective wind turbine blade shell. The preform elements are prefabricated separately and then arranged and aligned in a blade mold according to the requested geometry of the wind turbine blade to be manufactured. The preform elements may be arranged in the blade mold for casting an entire wind turbine blade or a large wind turbine blade part.

The preform elements may comprise one or more components, for example one or more textile layers, wherein the components are at least locally attached to each other by using a binding agent/adhesive agent. Such components may, for example, comprise a plurality of fiber mats and/or core materials, which are locally attached to each other to allow for their mutual handling. This facilitates the arrangement of the components in the blade mold. Preform elements may be understood as semi-solid elements. In particular, textile components of the preform elements, for example fiber mats, may consist of glass fibers, carbon fibers, or aramid fibers. These layers remain unaffected by the binding agent, such that they can be filled later on with a resin during the manufacturing of the rotor blade. Core material may, for example, comprise balsa wood, foam and the like. Using preform elements in particular allows to reduce the cycle time for production of wind turbine blades.

As a variant, prepackaged elements have been proposed. Here, components like fiber mats and/or core material are placed in a mold element, assuming the shape of the molding surface.

This shape is conserved by packing these components tightly in a vacuum bag.

In another approach, it has also been proposed to use precast elements, that is, parts of a wind turbine blade or wind turbine blade segments which already comprise cured resin and can also be used for building the wind turbine blade.

Preform elements may, for example, be fabricated in a manufacturing assembly, which may also be called a preform mold. Such a manufacturing assembly usually comprises a mold element, for example a mold shell, which comprises a molding surface shaped according to the desired shape of the preform element, whereon the components are placed to assume the corresponding shape. Preferably, the preform elements are covered in a vacuum bag to stabilize the stack of components that constitutes the preform element.

In modern wind turbines, wind turbine blades of different geometries, in particular sizes, are employed. Hence, if different types/sizes of wind turbine blades are to be manufactured, the size of the preform elements varies in accordance with the blade dimensions they are intended to be used for. In particular, preform elements primarily vary in height and width, wherein, in addition, even in a certain type of wind turbine blade, different shapes may occur.

However, manufacturing assemblies for preform elements, in particular the preform molds, today are mostly designed for a certain preform element size and/or shape. In particular, preform elements of a given size and shape are manufactured in dedicated manufacturing assemblies for preform elements. This, however, is not a viable approach for mass production, since a very large number of manufacturing assemblies would be required as well as, in many cases, lifting and/or transport tools.

WO 2019/115 522 A1 proposes a method of manufacturing at least two preforms for molding a wind turbine blade, wherein the preform mold structure used has a molding surface of variable shape such that the shape of the molding surface can be varied at least between a first and a second configuration by using actuators. However, mold elements having a molding surface of variable shape are of a complex, expensive construction and in particular do not allow for scaling the shapes provided by such an adaptable mold element. In particular, such a mold structure could not provide molding surfaces for different widths and/or heights of preform elements to be manufactured.

Like problems arise for the manufacturing of prepackaged elements and precast elements.

It is an object of the current invention to provide an improved manufacturing setup allowing the production of a variety of preform elements and/or precast elements and/or prepackaged elements, in particular of different size and/or shape, that is flexible, cost-efficient and in particular also easily transportable.

This object is achieved by providing a mold element support device according to claim 1, a manufacturing assembly according to claim 14, and a manufacturing system according to claim 15. Advantageous embodiments are described by the dependent claims.

A mold element support device for a manufacturing assembly for preform elements and/or precast elements and/or prepackaged elements, in particular for a wind turbine blade, comprises multiple vertical column elements which comprise an upper support portion for carrying a longitudinal mold element, in particular a mold shell, for manufacturing a preform element and/or precast element and/or a prepackaged element. As a first feature, the column elements comprise a height adjustment device to, in particular individually, adjust the height of the column elements. As a second feature, the support portions are distance-adjustable at least in a width direction of the mold element via a positioning device. The first feature and the second feature allow to adapt the mold element support device to differently shaped and/or sized mold elements.

Here, a mold element, in particular a mold shell, is a stiff, shape-keeping element having a molding surface shaped according to the desired shape of the preform element and/or precast element and/or prepackaged element, whereon, during manufacturing, the components are put to assume the corresponding shape. By adding a mold element, the mold element support device with the mold element supported thereon provides a preform mold (and/or precast mold and/or prepackaging mold) of a manufacturing assembly for preform elements and/or precast elements and/or prepackaged elements.

The mold element support device comprises multiple vertically extending column elements, which are height adjustable, and a positioning device allowing to adjust the relative position of support portions of the column elements, in some embodiments the column elements themselves, at least in a width direction and generally in a horizontal plane. Here, the vertical column elements comprise at least one vertically extending column section which can be prolonged or shortened by the height adjustment device. Vertical column elements may additionally comprise other, in particular horizontally extending sections, for example arms, as will be further discussed below.

According to the invention, means are provided to implement a manufacturing assembly for preform elements and/or precast elements and/or prepackaged elements that is flexible regarding the size and/or shape of the preform elements and/or precast elements and/or prepackaged elements to be manufactured. In particular, mold elements for a large number of sizes and/or shapes of preform elements and/or precast elements and/or prepackaged elements can be provided to form a manufacturing system. To produce another size and/or shape of preform elements and/or precast elements and/or prepackaged elements, the previous mold element can be removed, the mold element support device can be adjusted for supporting the new mold element, and the new mold element can be supported on the mold element support device. Adjustment is facilitated by providing the height-adjustable column elements as well as the positioning device. The column elements can be understood as "adjustable legs" that can, preferably, be adjusted individually in their height and the position of their support portion.

Hence, the manufacturing assembly, or work station, respectively, can handle mold elements with varying geometries. The manufacturing assembly is not specific for a certain wind turbine blade, in particular a certain size/dimension of a wind turbine blade. Hence, the manufacturing assembly can be used to make preform elements and/or precast elements and/or prepackaged elements for several different wind turbine blade types. To achieve this, multiple different mold elements may be provided.

Regarding the column elements and the positioning device, as will be further detailed below, the mold element support device can be implemented as modular, such that it can, for example, be disassembled and tightly packed into a transport housing, for example a container. If column elements, in particular pairs, along the longitudinal direction of the mold element are provided separately, a length adjustment can easily be provided by adding or removing column elements, due to the modular construction.

For example, flanges or other edge regions of the mold element can be supported on the support portions of the column elements. Here, easy adjustment is possible to varying heights along the length of the mold element, for example due to special design features, which may, for example, be provided for lightning protection systems and the like. If, for example, the flange of a mold element is locally higher than along the rest of the length, a corresponding column element may be adjusted to this larger height. Accordingly, the positioning device may be used to adjust for locally larger or smaller widths. However, the height adjustment option provided can also be used to generally adjust the working height, in particular regarding additional tools or assistance devices used during manufacturing. For example, the flange height may be adjusted to provide optimal working conditions for manufacturing personnel.

Generally speaking, manufacturing equipment can also be reused or even, if a blade type is discontinued, recycled for use with another wind turbine blade type. Hence, in addition to cost-effectiveness, a quick transition to a new blade type manufacturing is possible. Since only the mold element is exchanged (and the mold element support device accordingly adjusted), the process of manufacturing preform elements and/or precast elements and/or prepackaged elements may be assimilated or even standardized for different types of wind turbine blades, making it easier for manufacturing personnel to switch between the production of different blade types. In particular, the manufacturing assembly may also be used for different types of wind turbine blade manufacturing. For example, the manufacturing assembly described herein may be used for integral blade manufacturing as well as blade half manufacturing. Finally, the manufacturing assembly can be used for both preform element/prepackaged element and precast element manufacturing.

In particular, a manufacturing system is conceivable, wherein at least one mold element support device may be combined with a plurality of mold elements, which can all be used with the mold element support device to build a manufacturing assembly for certain different types, in particular sizes, of preform elements and/or precast elements and/or prepackaged elements. In particular, each such manufacturing assembly can be able to manufacture preform elements, for example concave preform elements, which may be packed in vacuum bags and/or vacuum foils. In particular, it may even be possible to pack more than one preform element and/or precast element and/or prepackaged element on top of each other during manufacturing. Regarding vacuum bags, different types and designs can be employed, for example like described in post-published European patent application 21209596.2.

In embodiments, each height adjustment device may comprise a telescopic device and/or a controllable, in particular electric or hydraulic, actuator. Hence, different constructions are conceivable, wherein, for example, a preferably cylindrical section may telescopically be raised or lowered from a base section. Preferably, automatic height adjustment is enabled by providing a controllable actuator, which may, for example, be an electronic and/or hydraulic actuator. The mold element support device may comprise operation elements, for example located at each column element and/or provided as at least one remote control device. Preferably in addition to actuators for height adjustment, for at least one degree of freedom, the positioning device may also comprise actuators, which in particular can cause relative movement of at least support portions of at least two of the column elements, in particular responsive to usage of at least one operation element. Certain control processes may also be automated, for example by controlling actuators using a control device.

In a preferred embodiment, the positioning device may comprise rails extending in the width direction, wherein the column elements are movably guided in or on one of the rails, respectively. In one embodiment, a pair of column elements to be placed at opposite side edges of the mold element, in particular for supporting opposite flanges of the mold element, may be guided by a shared rail. That is, at least two column elements may be guided in or on the same rail, the rail defining a position along the length of the mold element support device and hence the mold element and extending in the width direction. In this manner, the pair of column elements may be placed symmetrically in an opposing fashion at opposite side edges of the mold element, in particular each supporting a flange of the mold element. Easy construction facilitating symmetric placement of column elements is achieved.

However, in another embodiment, a rail may also be assigned to each individual column element, such that those rails and hence column elements may also be shifted in the longitudinal direction for at least essentially opposing column elements, providing additional flexibility and degrees of freedom.

This, in particular, allows column elements to be positioned out of line with a counterpart, which is oppositely placed, and/or unevenly spaced column elements on one or both sides of the mold element.

Preferably, each such rail with the at least one column element running thereon may form a module in a modular construction of the mold element support device, as discussed above.

Generally, to prevent deflection and/or deformation of the mold element, at least one, in particular lower, additional column element may be located in a middle section below the mold element to provide additional support. In a preferred embodiment, if a pair of column elements guided in or on a shared rail is used, the in particular lower additional column element may be located between the column elements of the pair and guided in or on the shared rail to additionally support a middle section of the mold element. Generally said, as an advantageous option, one or more additional column elements, that is, support elements, can be provided to help support the mold element, for example for placement in a middle section of the mold element. Preferably, such additional column elements may be placed at the lowest point of a mold element in a width direction at a certain length position. This lowermost point of the mold element usually depends on the concrete shape of the mold element, which may not necessarily be symmetrically curved.

In embodiments, the mold element support device may be floor-mounted. That is, the positioning device may comprise attachment means for releasably mounting the column elements to a floor. This is particularly advantageous in the case of rails, which may, for example, be mounted directly to the floor, for example at different length positions of a mold element to be supported. The attachment means are preferably releasable, providing further flexibility since, for different mold elements, different mounting positions on the floor can be chosen. In other words, the mold element support device may be easily moved to another position. If, for example, a longer mold element is to used next, rails, in particular carrying a pair of column elements to be placed in an opposing fashion in width direction, can be unmounted and moved to a new position corresponding to the increased length.

In another embodiment, it is also conceivable to use rails integrated into the floor for an especially robust design.

In other, alternative embodiments, the positioning device may also comprise wheels. In this case, preferably, the positioning device may additionally comprise a locking device, in particular a brake, associated with the wheels. It is, however, also conceivable to have support legs in addition to the wheels and to lower the wheels to a position below the feet of the support legs to be able to move column elements supported by the positioning device, in particular on a rail supported on the wheels, to a new position. One advantage of providing wheels is the option of moving the whole manufacturing assembly, that is the mold element support device with a mold element placed on it, as a whole, in particular with at least one preform element and/or precast element and/or prepackaged element or at least its components positioned in the mold element. In such an embodiment, for example, it may be possible to move preform elements and/or precast elements and/or prepackaged elements to be manufactured to a heating and/or cooling device, in particular an oven.

While using rails, releasable attachment means and/or wheels allow repositioning of a whole column element, it may also be possible to integrate the positioning device at least partly into the column elements, allowing movement of the support portion. In an especially preferred embodiment, each column element may comprise, as part of the positioning device, a horizontally extending swivel arm. In different positions of the swivel arm, the support portion carried by the swivel arm is in different positions regarding the length and, more importantly, the width direction. Hence, such a swivel arm provides an easy manner to adjust the position of the support portion in the horizontal plane.

In a concrete embodiment, the swivel arm may be mounted on top of a vertical column section of the column element and/or carrying the support portion. The column element may, in particular releasably, be mounted to the floor using attachment means or more permanent mounting means. Rails may be additionally used.

In such a construction using a swivel arm, each column element can be understood as a module of the modularly constructed mold element support device. A large degree of freedom is provided between the individual modules, that is, column elements. Such an embodiment is highly flexible, in particular in the case of releasable attachment means for attachment to the floor. In addition, it is easy to transport and cost-efficient in construction and use.

Preferably, the support portion may comprise an, in particular flat, contact surface for contacting the mold element, and a tilting device, in particular a ball joint, for tilting the contact surface into different contact orientations. Mold elements may have differing flange designs or, generally, edge designs. Additionally, support portions may be used where the mold element generally has a surface which is tilted out of the horizontal plane. In all those cases, preferably, additional degrees of freedom can be provided for the support portion by providing a tilting device allowing tilting of the contact surface out of the horizontal plane to adjust to the orientation of the mold element where it is to be engaged. For example, the flange of the mold element may comprise an oblique mold surface bounded by an edge shoulder. In such an embodiment, the support portion, in particular the contact surface, may be placed adjacent to the edge shoulder in an orientation corresponding to the oblique mold surface. Preferably, the tilting device may comprise a ball joint. In some embodiments, it may be sufficient to provide a simple joint allowing tilting/pivoting only in one plane, in particular around a rotation axis extending in the longitudinal direction.

In embodiments, the support portion may also comprise a low friction material and/or, in particular longitudinally oriented, rollers in a contact area to the mold element. Having a low friction material, in particular on the already mentioned contact surface, allows easy addition and removal of mold elements, for example if the mold element is to be slid upon or slid from the contact surface in the contact area. Rollers, which may preferably be oriented in the longitudinal direction of the mold element, allow to achieve similar advantages.

The mold element support device may further comprise at least one longitudinal working platform for manufacturing personnel. Such a working platform is to be placed longitudinally along the mold element, wherein the positioning device is additionally adapted to, at least partly, position the working platform. In this manner, a flexible walkway for manufacturing personnel along the mold element/preform mold is provided.

In this context, preferably, if the positioning device comprises at least one rail extending in the width direction, the at least one working platform may also be guided in or on at least one of the at least one rails and/or be motion-coupled to an outermost column element in the width direction, wherein the outermost column element is guided in the rail. In this manner, the working platform can follow the column elements and hence the support for the mold element. Here, the working platform may run in the same rails and/or be motion-coupled to respective outermost column elements, such that, when these column elements are moved in the width direction, the working platform follows and remains adjacent to the mold element.

In preferred embodiments, the mold support device may further comprise a height adjustment means, in particular a telescopic means and/or scissors mechanism, for the working platform. In this manner, the height of the working platform can be adjusted to fit the height of the mold element, such that an optimal working position for manufacturing personnel can be achieved. In particular, an operator can reach directly or indirectly the molding surface. As the height adjustment means for the working platform, for example, the scissors mechanism can be provided. Of course, other implementations can also be used, such as, for example, telescopic means.

Generally speaking, working platforms may be provided on each side of the mold element. These working platforms may be independently adjustable in height. The working platforms may further comprise a climbing means, for example, a pivotingly hinged ladder or stairs.

A manufacturing assembly for preform elements and/or precast elements and/or prepackaged elements according the invention comprises a mold element support device according to the invention and a mold element supported on the mold element support device, hence providing a complete preform mold (or precast mold/prepackaging mold, respectively). All features and advantages discussed regarding the mold element support device can analogously be applied to the manufacturing assembly. In particular, the manufacturing assembly can be part of a manufacturing system comprising different, exchangeable mold elements, in particular mold elements of different size and/or different shape.

Here, the mold element, in particular mold shell, can be constructed/manufactured as already proposed in the art or employ alternative, novel designs. For example, the mold element may comprise a classical laminate, which is relatively heavy and expensive, but suitable since it allows heat transport through the layers of the laminate, for example for heating and/or cooling the binding agent of a preform element. In other embodiments, a sandwich structure of the core may be provided, for example comprising fiber glass layers on both sides of a core element, which may be made of a core material like balsa wood or foam. Such a construction is cheap, strong and relatively light in weight, however, does not provide ideal heat transfer through the mold element. Such a sandwich structure can be made even lighter in weight if carbon fiber layers are combined with a core material based on foam. However, such a construction may be more expensive due to the use of carbon.

In another embodiment, the sandwich structure may be modified to include at least one layer providing internal channels and/or voids. For example, such an additional layer may be placed on a laminate stack such that the laminate stack and the additional layer can be enclosed between outer layers, for example made of fiber glass. For example, the additional layer may be a ParaBeam™ layer. Such internal channels and/or voids in the mold element can advantageously be used to heat and/or cool the preform element and/or precast element and/or prepackaged element from below, in particular by supplying a cooling or heating fluid to the internal channels and/or voids.

Such internal channels can also be provided in a 3D-printed construction of the mold element. Here, the internal channels may also be used to provide cooling or heating to the preform element and/or precast element and/or prepackaged element from below.

In another embodiment, it is also conceivable to provide a mold element which is constructed of a honeycomb-based core material sandwiched between outer layers comprising carbon fibers, to further reduce the weight of the mold element.

Generally, the manufacturing assembly may additionally comprise at least one assistance device providing at least one component for the preform element and/or precast element and/or prepackaged element to manufacturing personnel. For example, the at least one assistance device may provide fiber mats and/or fiber material and/or core material and/or binding agent. For example, components, in particular fiber mats, can be provided on a pallet hanging from a gantry crane or overhang crane which may be oriented in the width direction or in the longitudinal direction. Here, preferably, the height of the pallet suspended from the crane can be adjusted so that the components, in particular the fiber mats, can easily be reached for the manufacturing personnel, in particular from both sides of the mold and/or on the working platform. It is noted that, if working platforms that are height adjustable are provided, these may be adapted to be in an optimal position for working, in particular also depending on the size of the operator. Regarding longitudinally oriented overhang cranes or gantry cranes, it is noted that these may be moved between parallelly oriented and positioned manufacturing assemblies to provide components to multiple manufacturing locations. However, the or an assistance device can also be a fiber laying machine, which can be CNC-controlled and comprise a cutting device cutting fiber material to a required length while laying it directly into the preform mold. A fiber material stock can be placed near the manufacturing assembly so that the fiber laying machine can be loaded separately or continuously.

It may be noted that such an assistance device can also be configured to directly apply the binding agent to the component, for example fiber mats, as has already been proposed in the art.

In the current invention, the mold element can be exchanged so that preform elements and/or precast elements and/or prepackaged elements of a different geometry, in particular different shape and/or size, can be manufactured. Here, several ways to exchange mold elements are conceivable. For example, a transport and/or storage device, which may be part of the manufacturing assembly and/or manufacturing system, for mold elements may be moved to the mold element support device, wherein lifting devices, for example comprising a lifting crane and/or using vacuum lifters, can be employed to move mold elements. For example, using the lifting device, one mold element previously used can be lifted from the support portions of the mold element support device and placed in a storing position and/or transport position on the transport and/or storing device. Then, another mold element can be lifted using the lifting device and moved onto the mold element support device, after it has been adjusted to the new mold element, in particular by using the height adjustment devices and/or the positioning device.

Here, a vacuum lifter comprising a rotatable lifting yoke is particularly preferable if the mold elements are transported and/or stored in an upright position. Using a vacuum lifter with a rotatable yoke, the horizontally oriented mold element can, after lifting from the mold element support device, be rotated into an upright, vertically oriented position and be lowered into the storage and/or transport position on the storage and/or transport device, or magazine, respectively.

In another approach, the mold elements may also be stored or transported in a horizontal position, such that they can, for example, simply be slid to and/or from the mold element support device when the transport and/or storage device is positioned at one longitudinal end of the mold element support device. In another embodiment, the transport and/or storage device may be moved over the mold element, gripping it from below and lifting it from the support portions to a transport and/or storage position.

Preferably, in such an embodiment, the transport and/or storage device may be a rack comprising a frame structure, which may be movable on wheels. Guided in or on vertical beams of the frame structure are support elements which may be height adjustable by moving the support elements in or on the vertical beams. In this manner, for example, once a mold element is supported on the support elements of the transport and/or storage device it can, for example, be lifted upwards, providing room for receiving another mold element on support elements being placed below the already used group of support elements. Of course, such room can also be provided by moving an already received mold element downwards and use a higher placed group of storage elements to receive another mold element. If a mold element is to be unloaded, it can, in the same manner, be positioned at the correct unloading height and be unloaded from the respective group of support elements of the transport and/or storage device.

Preferably, in any case, the transport and/or storage device can also be adapted to flexibly handle different geometries of mold elements. For example, support elements of the transport and/or storage device may comprise swivel arms, as already discussed above. To provide height adjustability of the support elements, the vertical beams may comprise rails in which the support elements can be mounted to be moved up and down, in particular also individually, in particular within a group. Alternatively, clamps which may be loosened and moved may be used. If swivel arms are used, different widths of mold elements can be handled; individual height adjustability allows to handle mold elements having different heights at different sides.

It is noted that such transport and/or storage devices may also be used to transport and/or store preform elements and/or precast elements and/or prepackaged elements manufactured using the manufacturing assembly.

Figure 2:
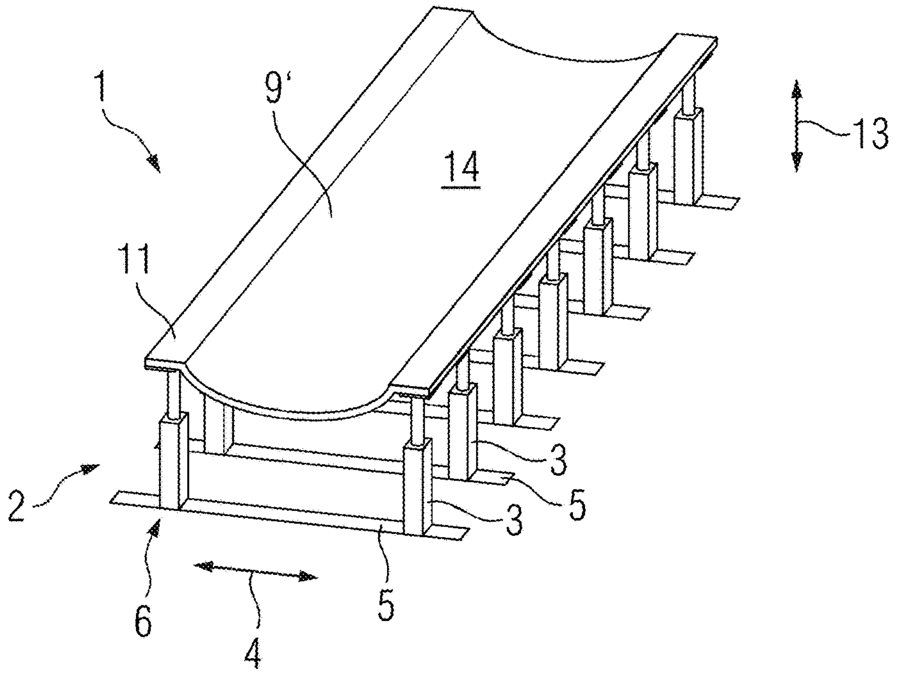
Figure 3:
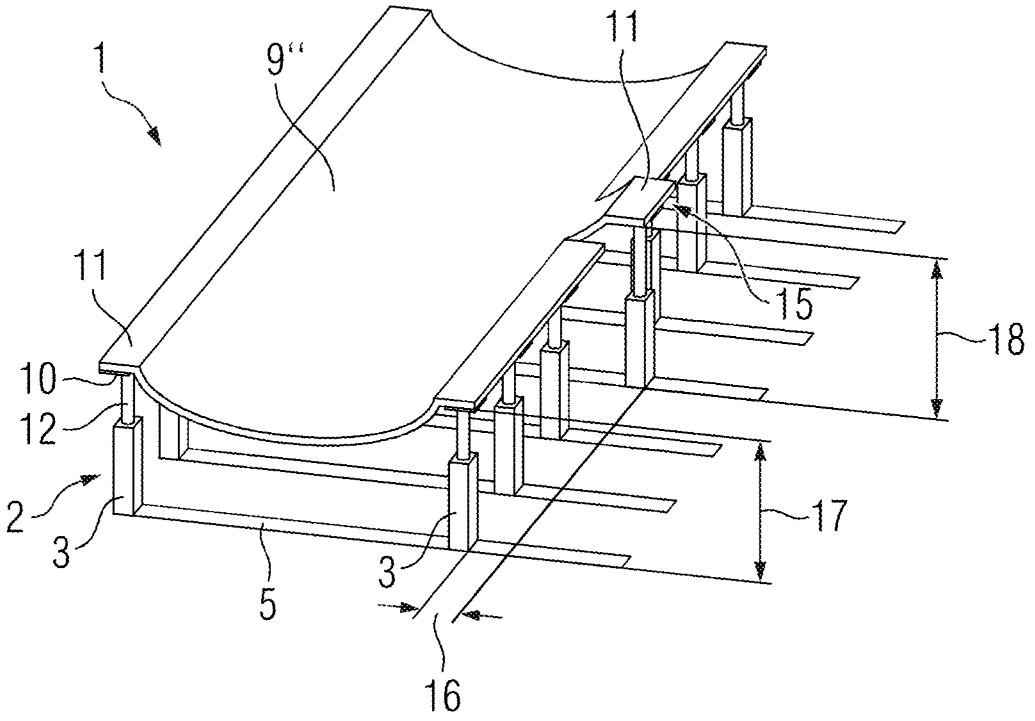
Figure 4:
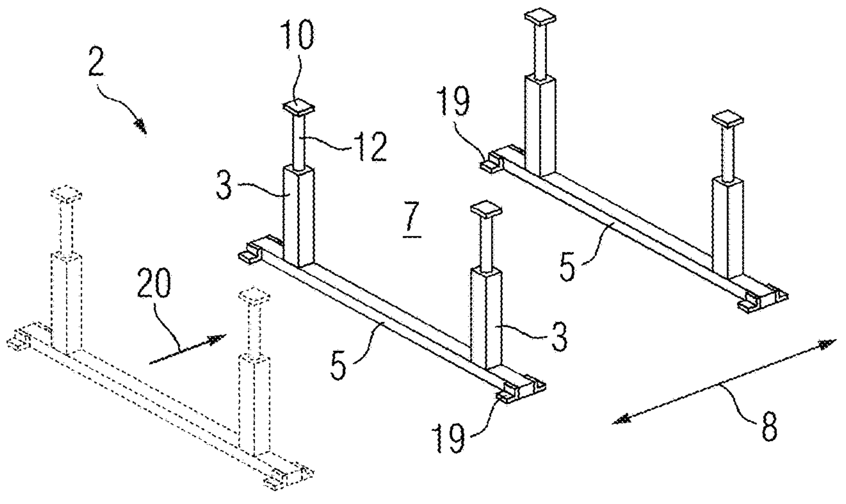
Figure 5:
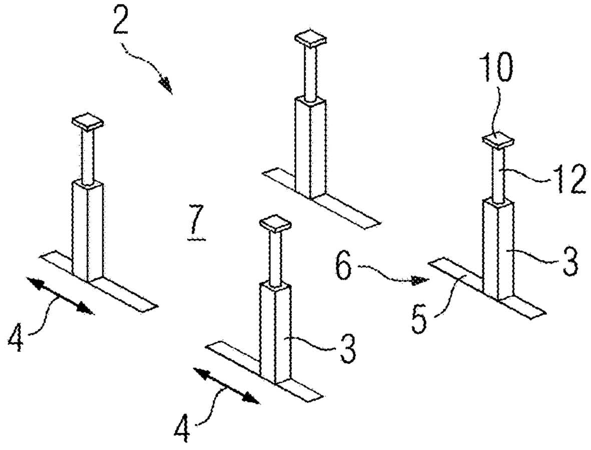
Figure 6:
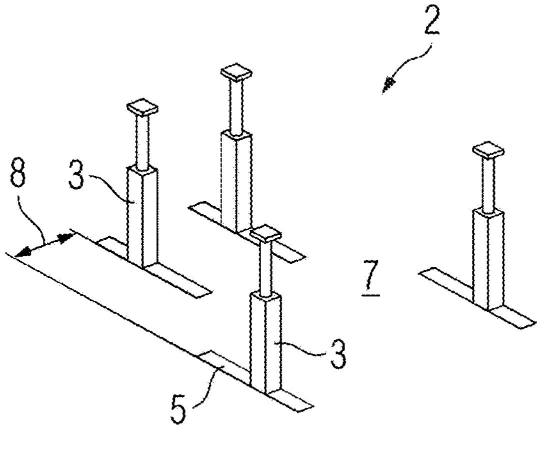
Figure 7:
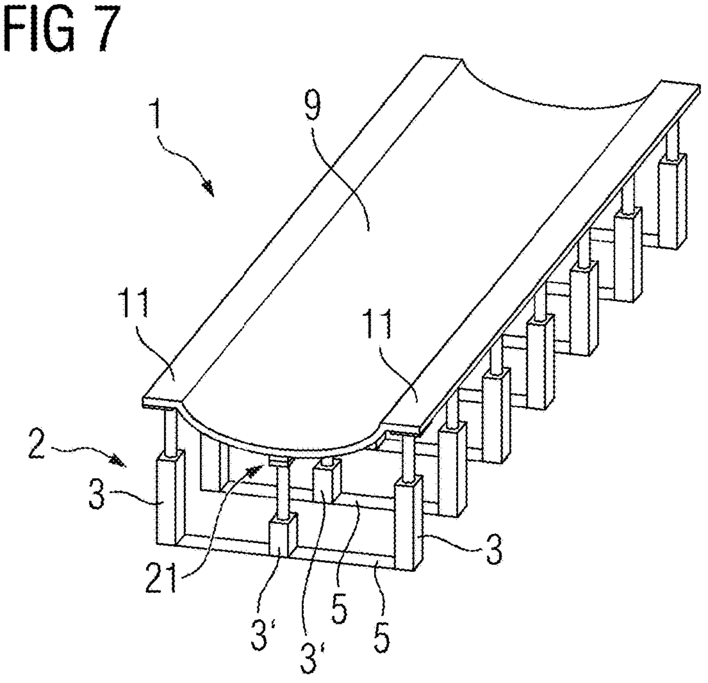
Figure 8:
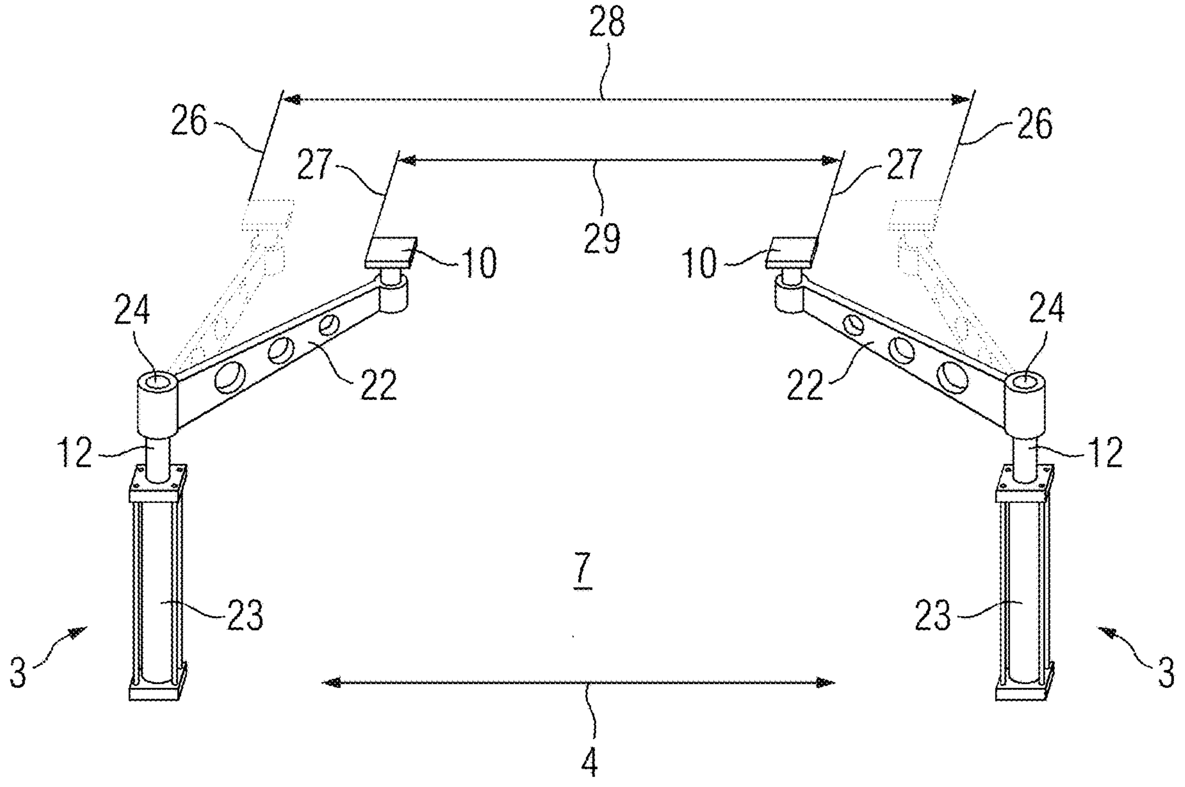
Figure 9:
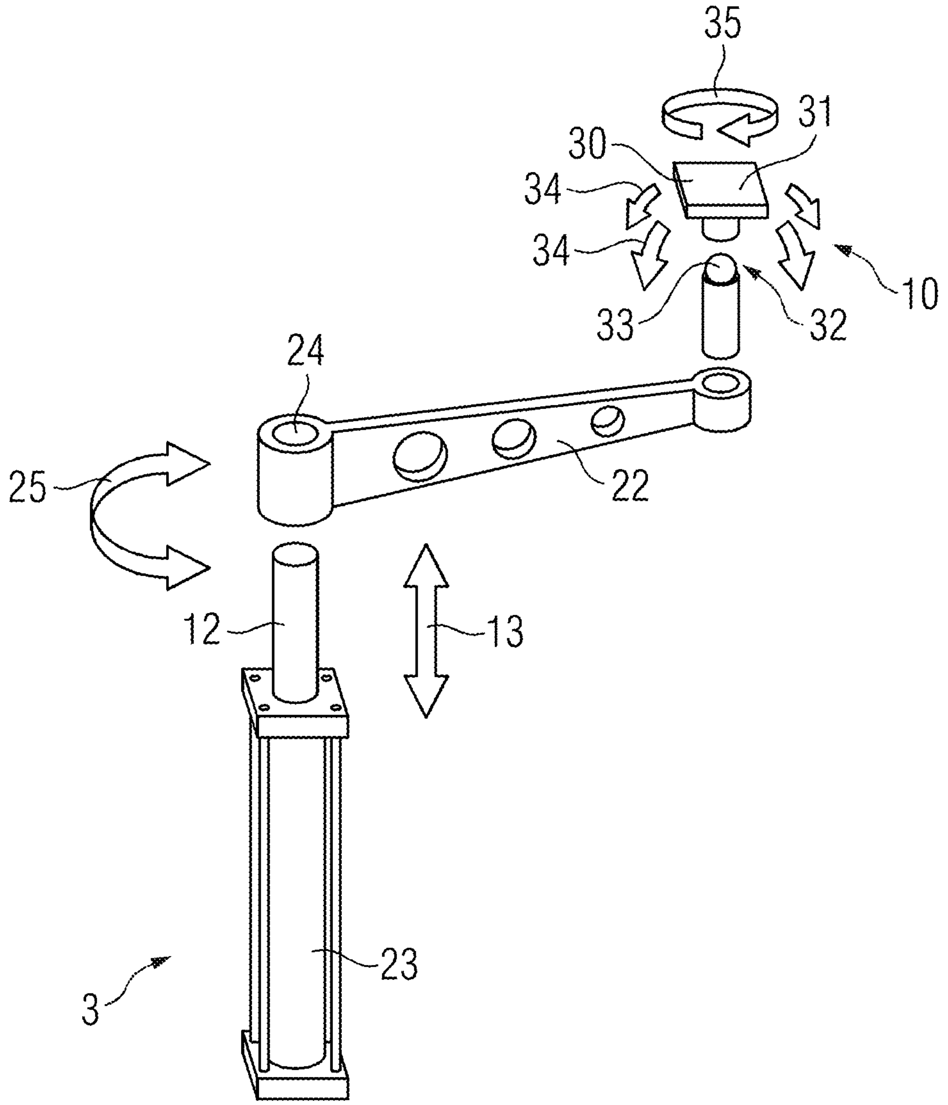
Figure 10A:
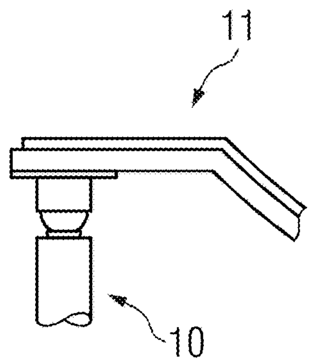
Figure 10B:
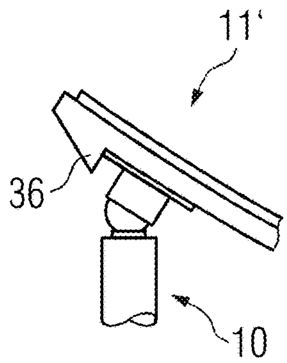
Figure 10C:
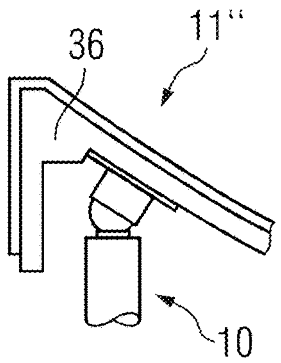
Figure 11:
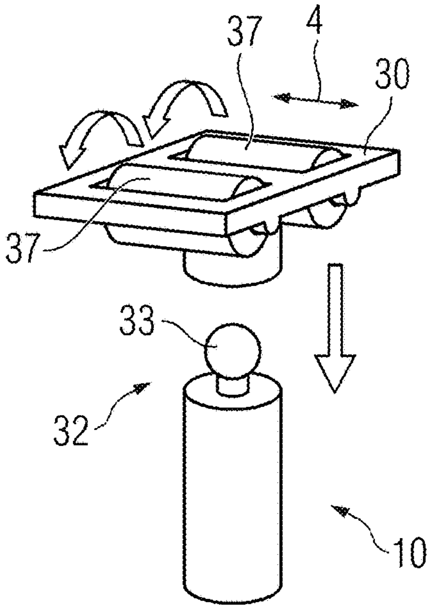
Figure 12:
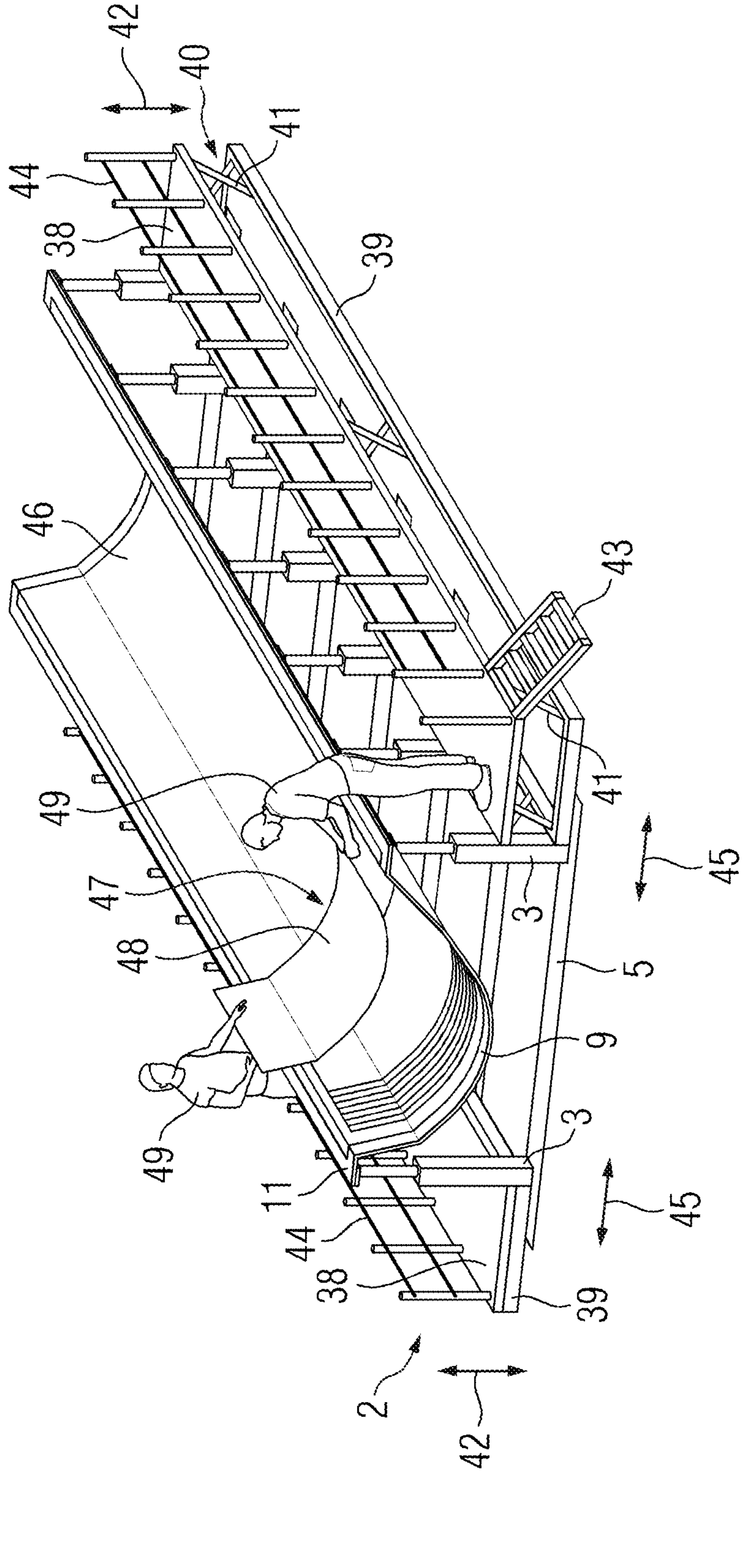
Figure 13:
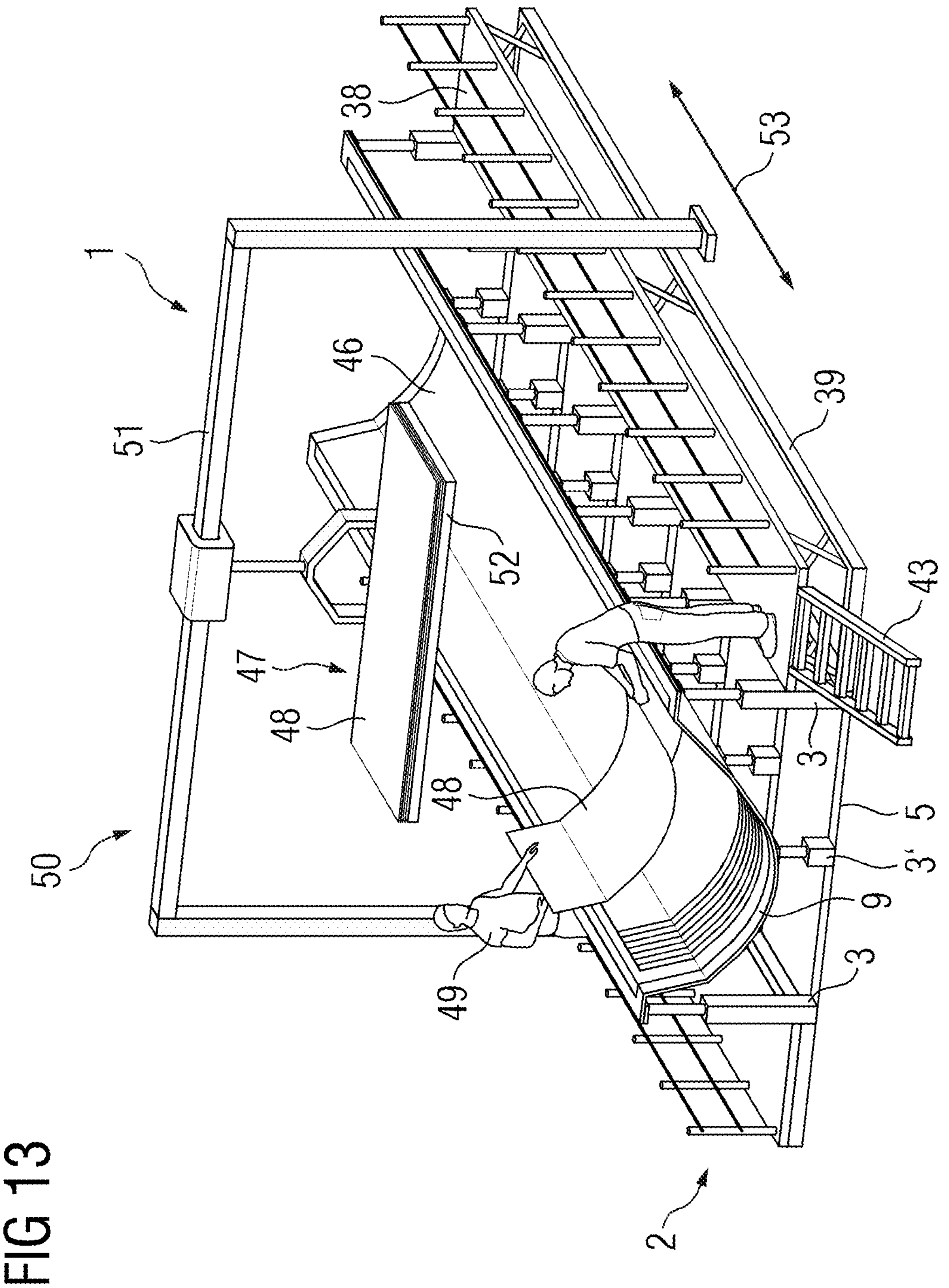
Figure 14:
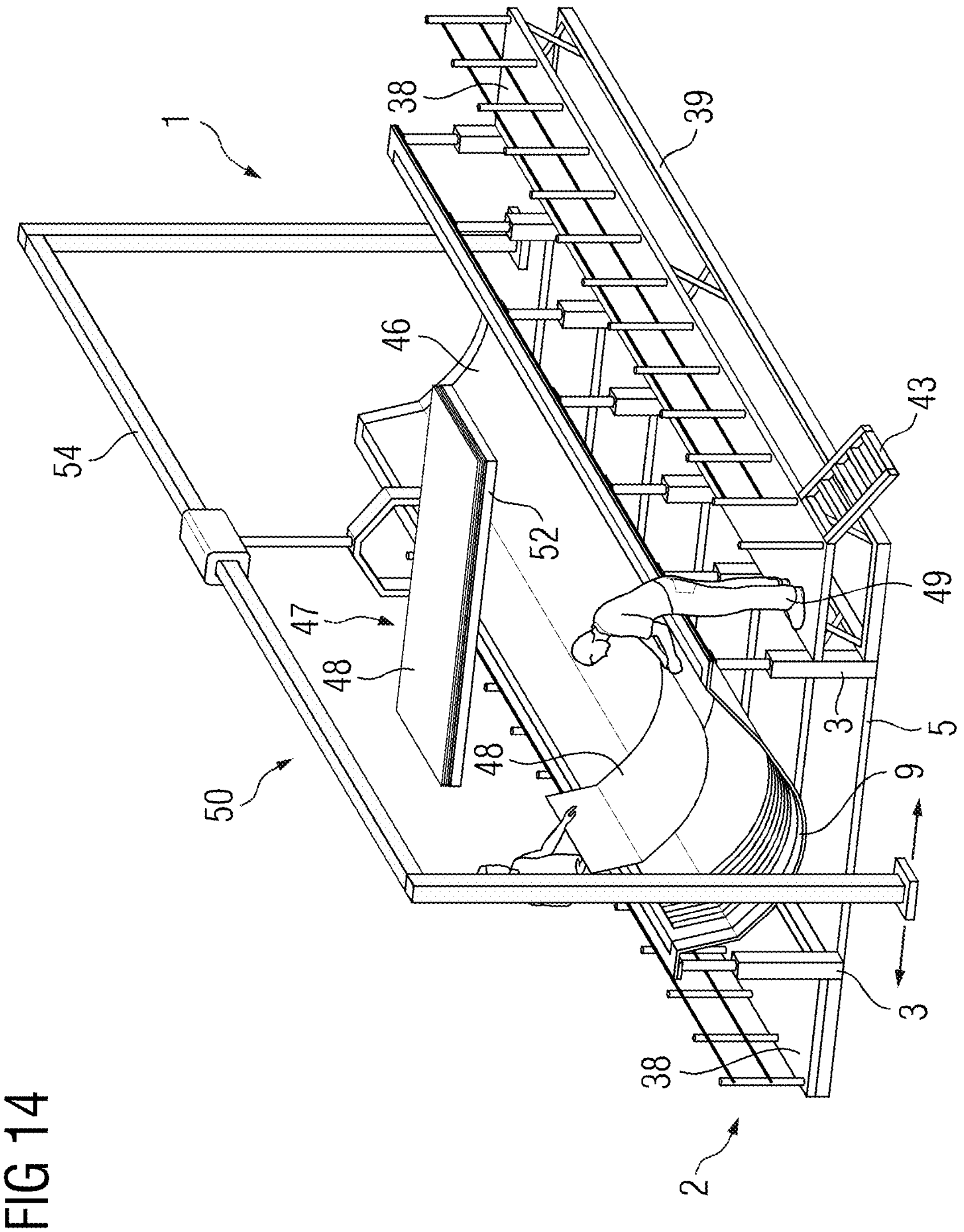
Figure 15:
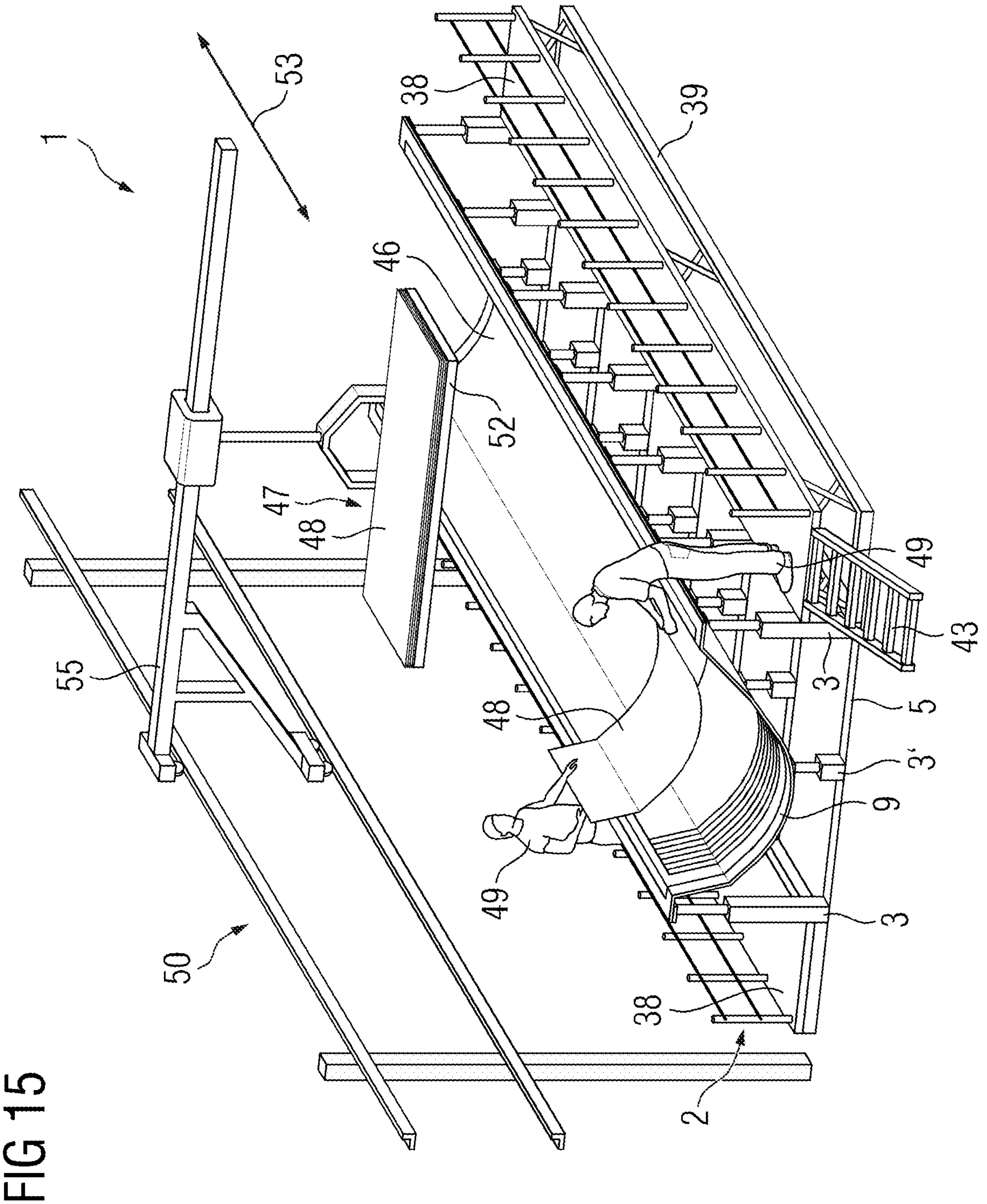
Figure 16:
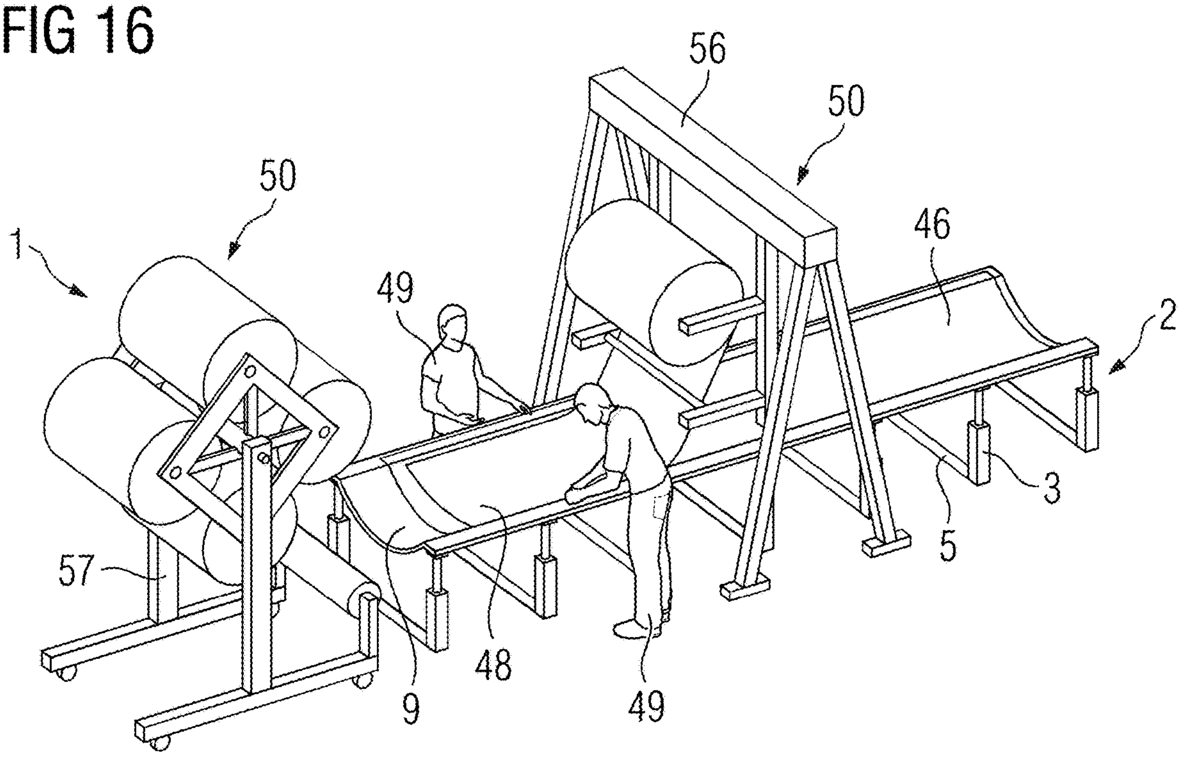
Figure 17:
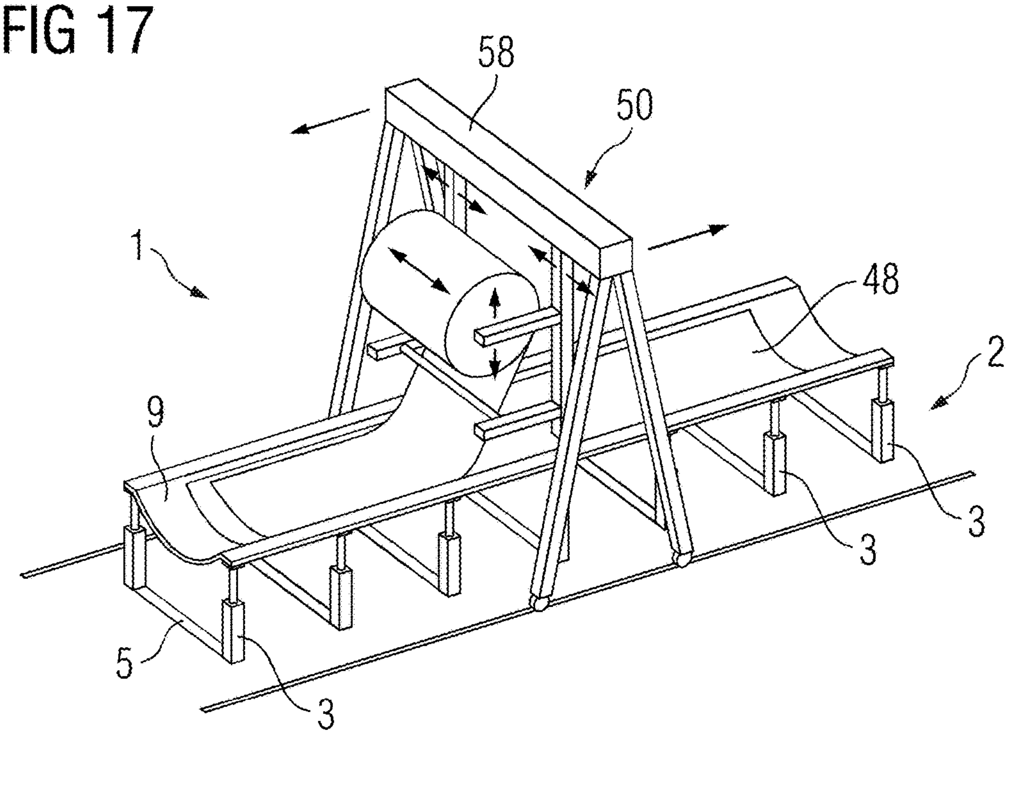
Figure 18:
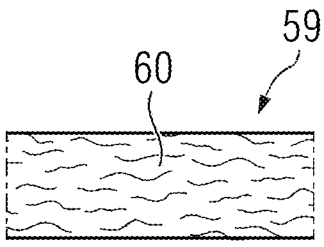
Figure 19:
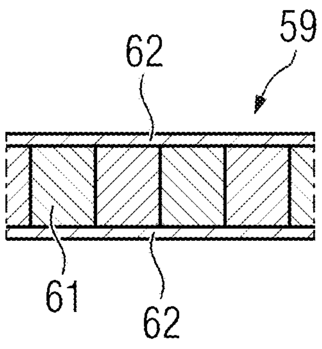
Figure 20:
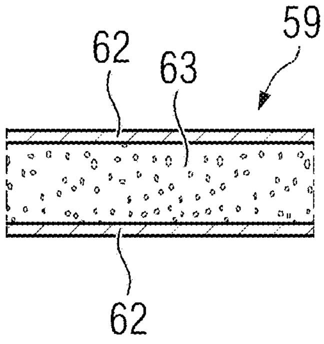
Figure 21:
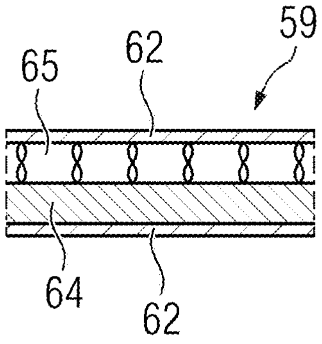
Figure 22:
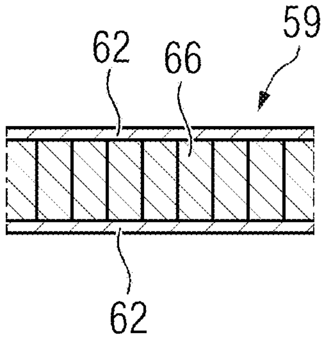
Figure 23:
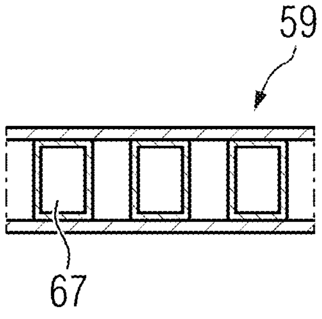
Figure 24:
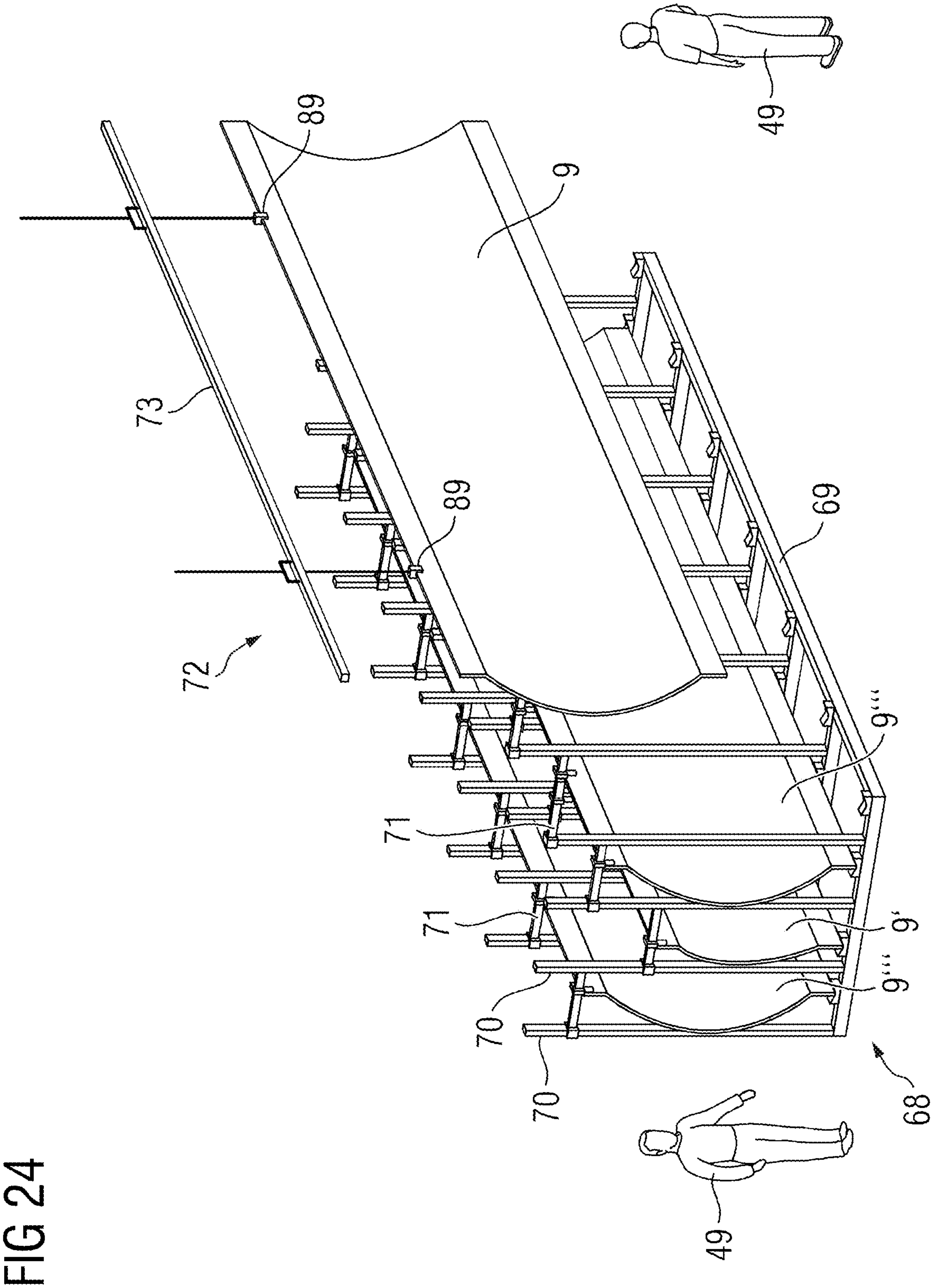
Figure 25:
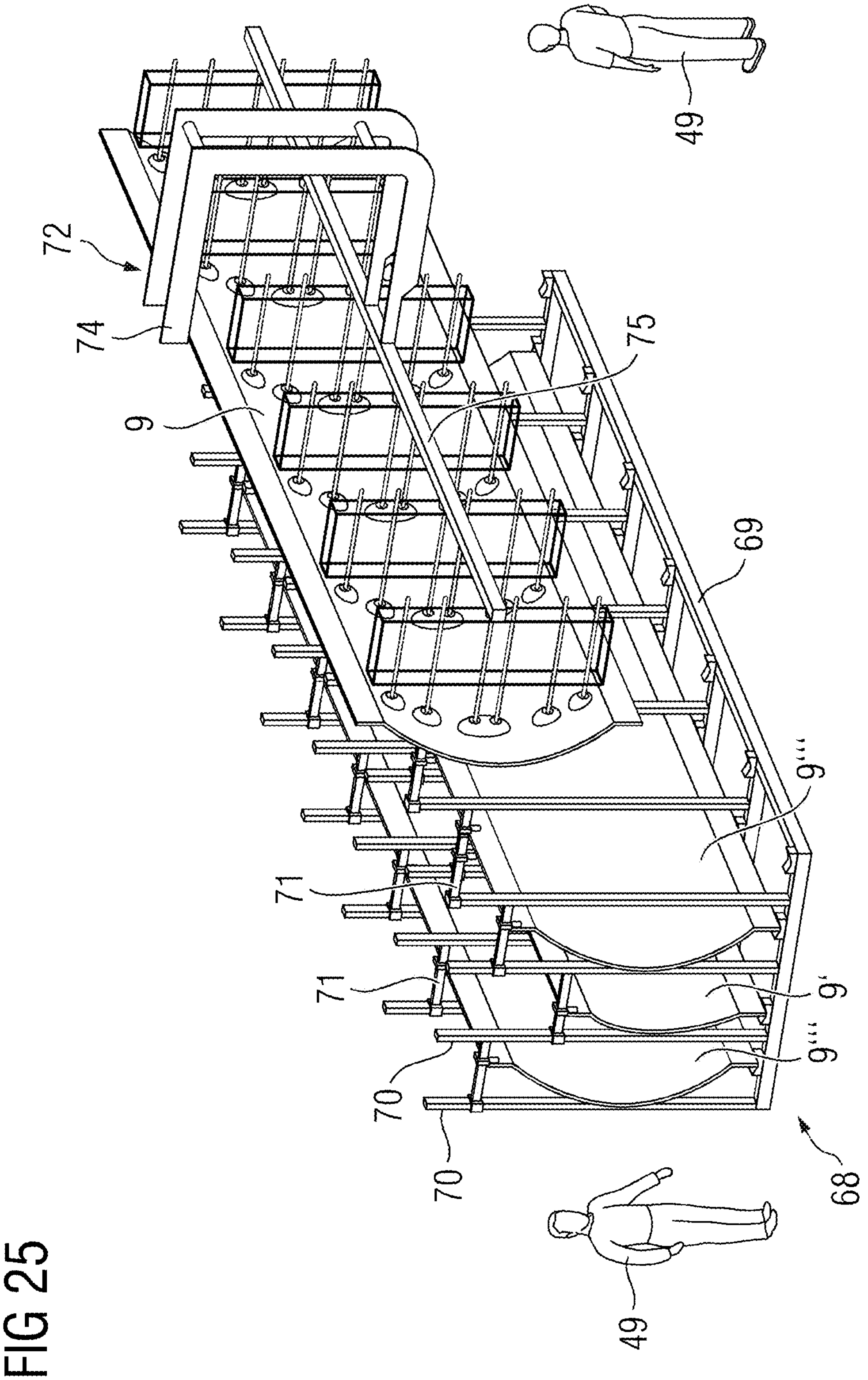
Figure 26:
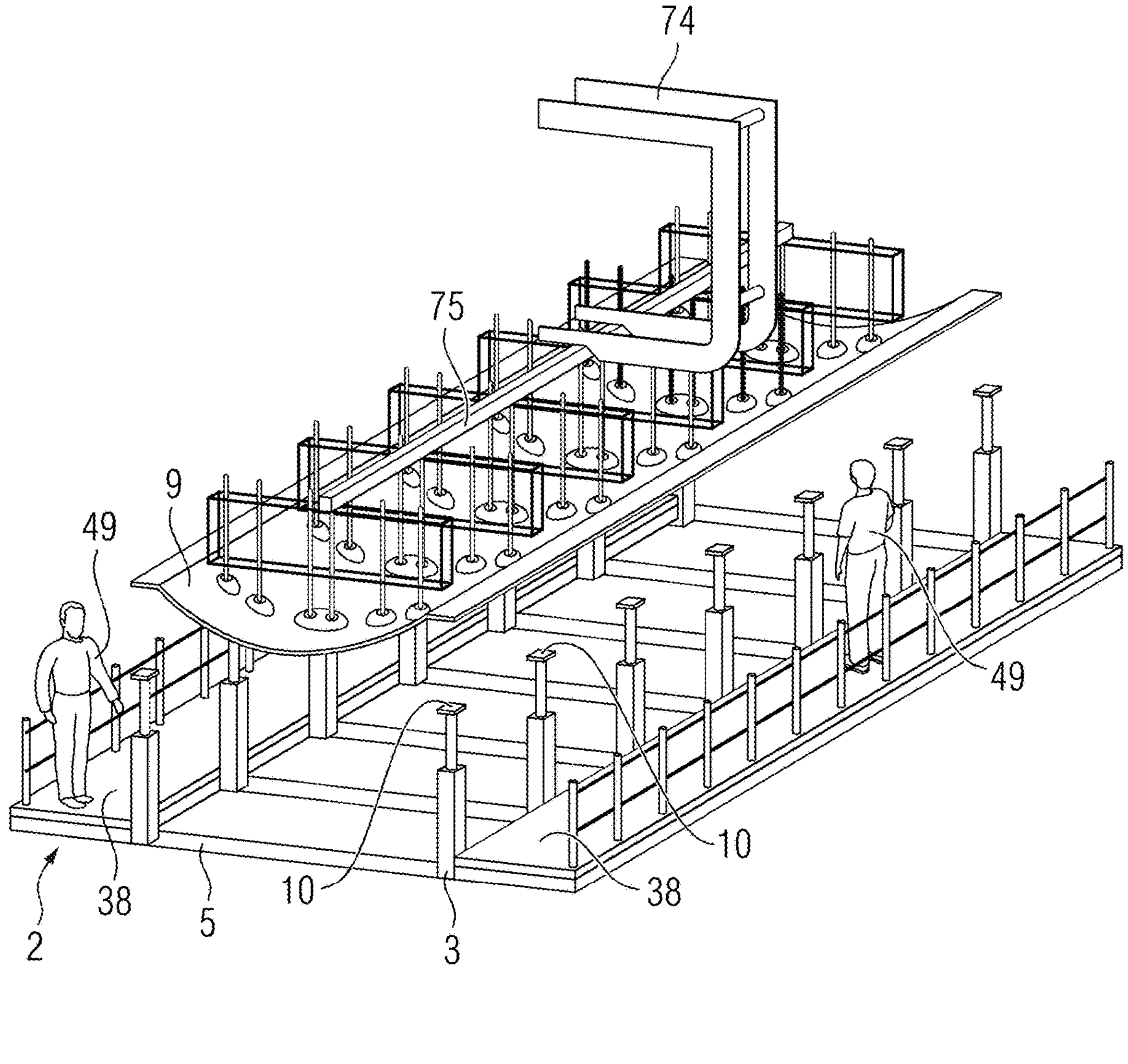
Figure 27:
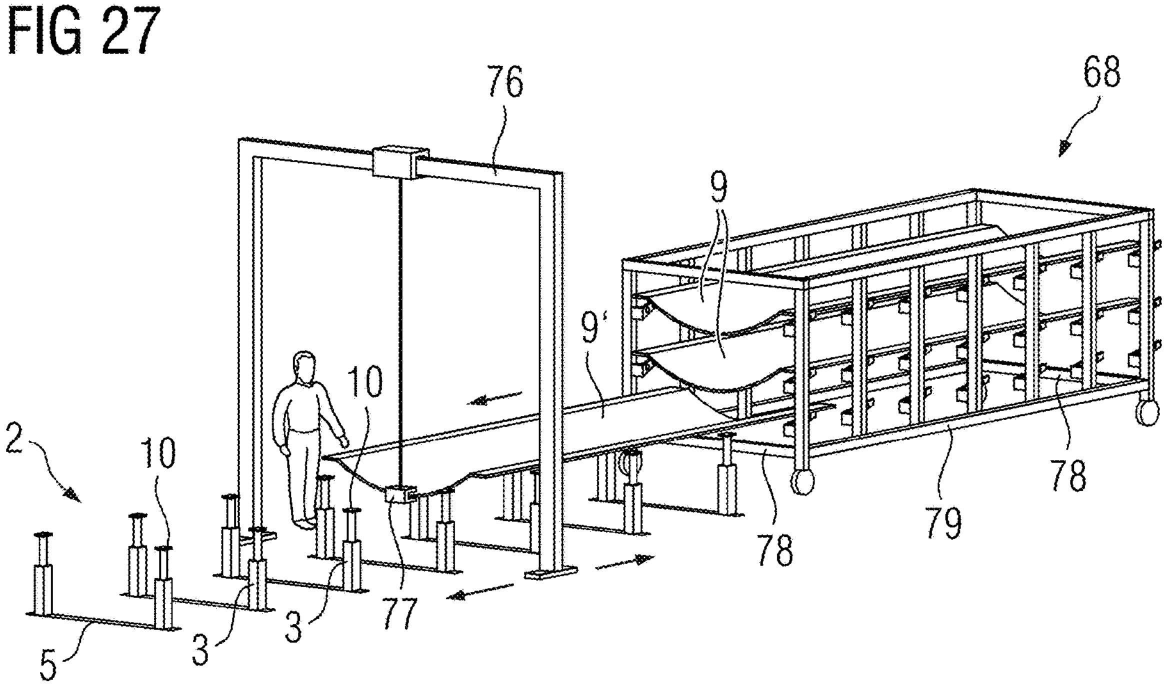
Figure 28:
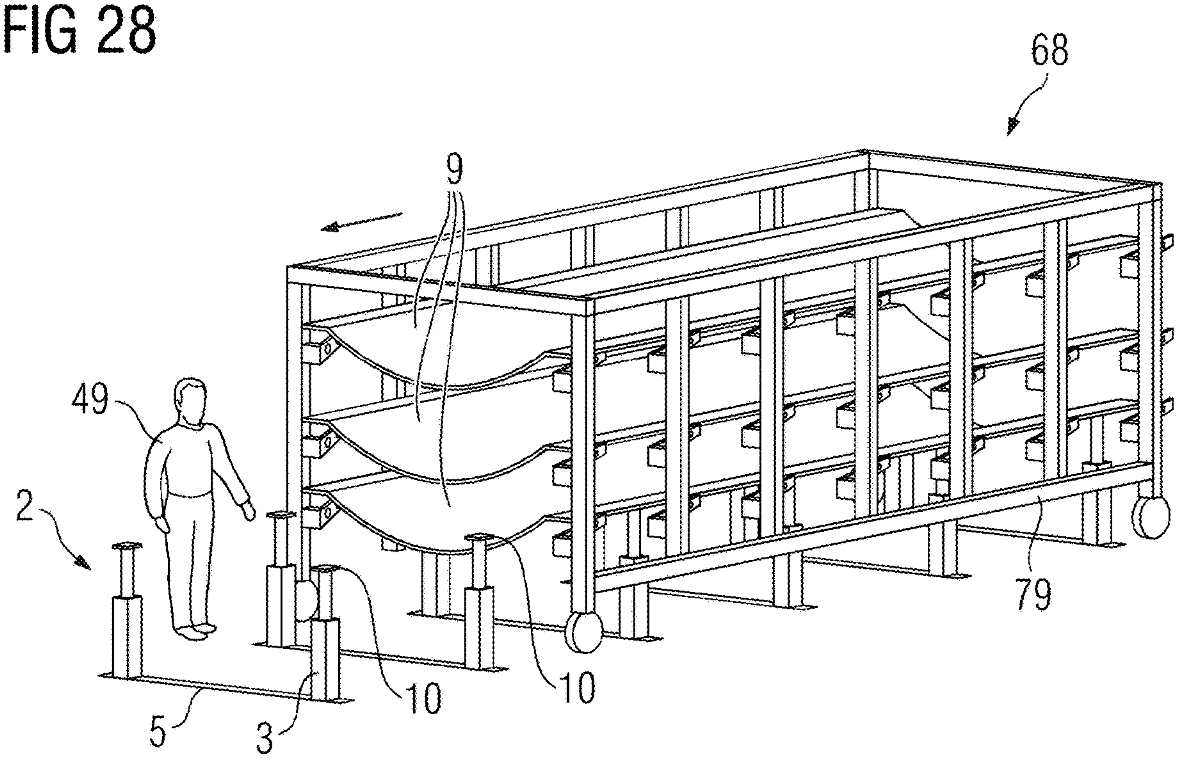
Figure 29:
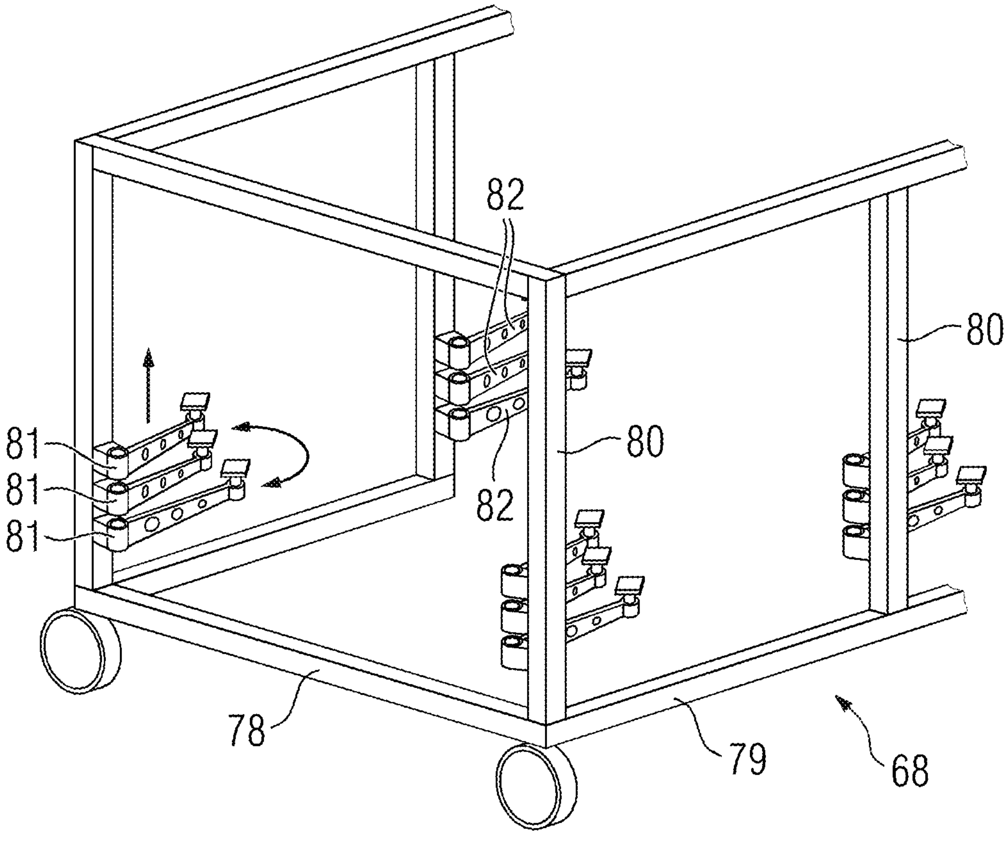
Figure 30:
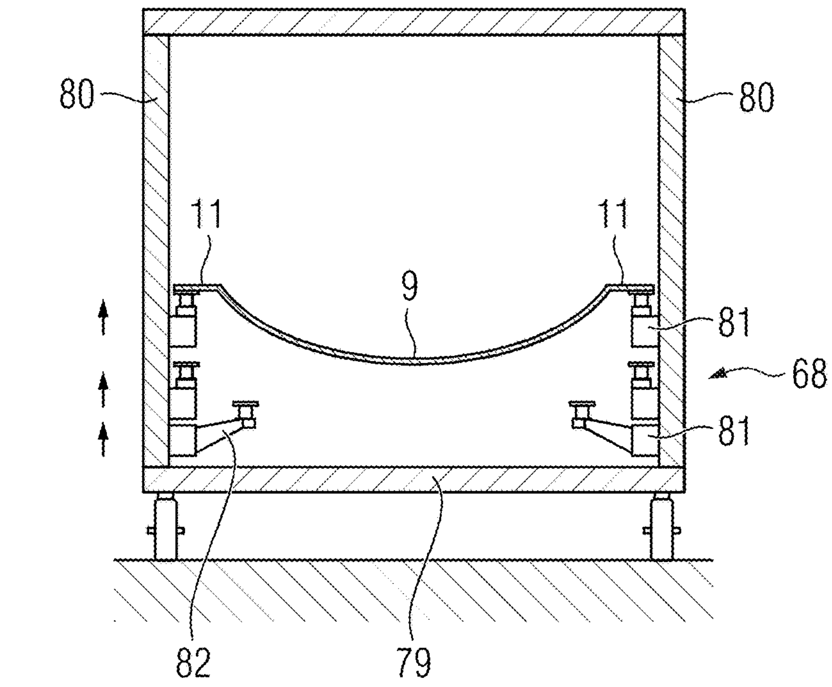
Figure 31:
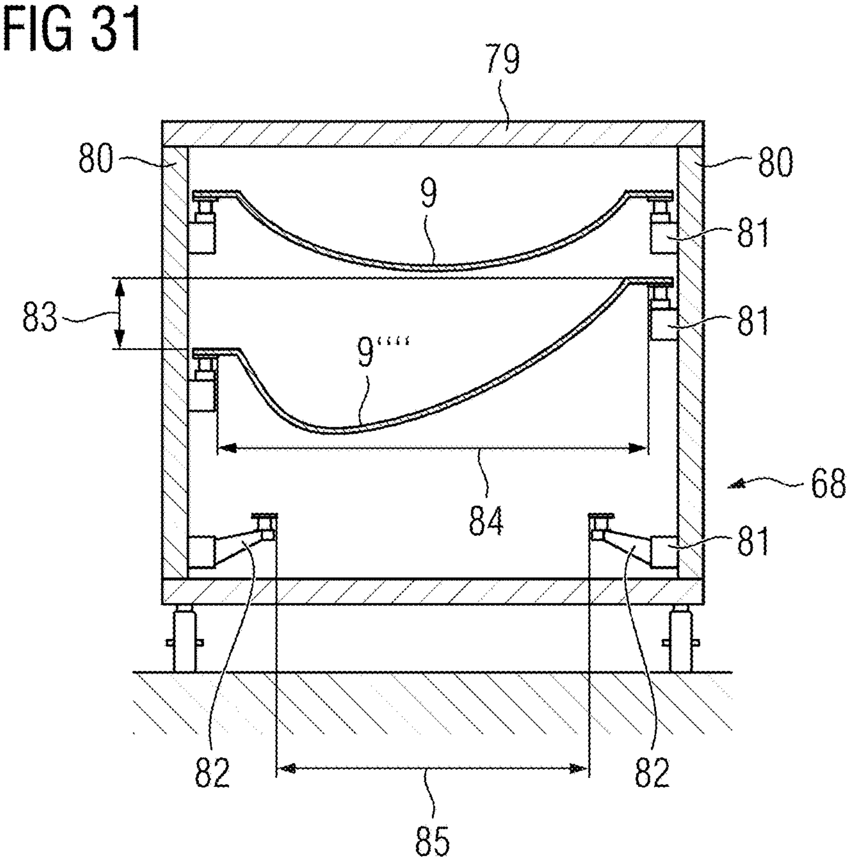
Figure 32:
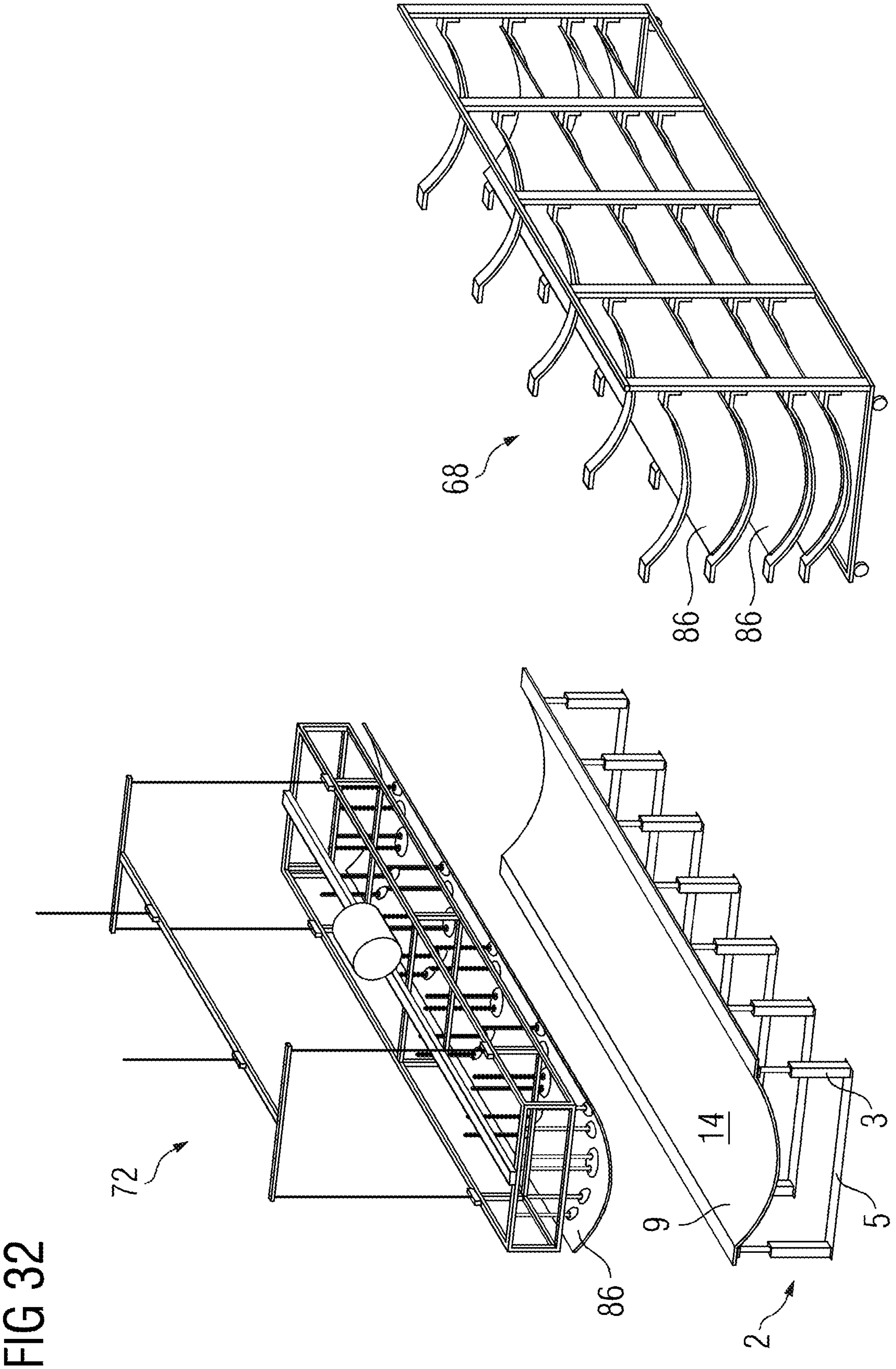
Figure 33:
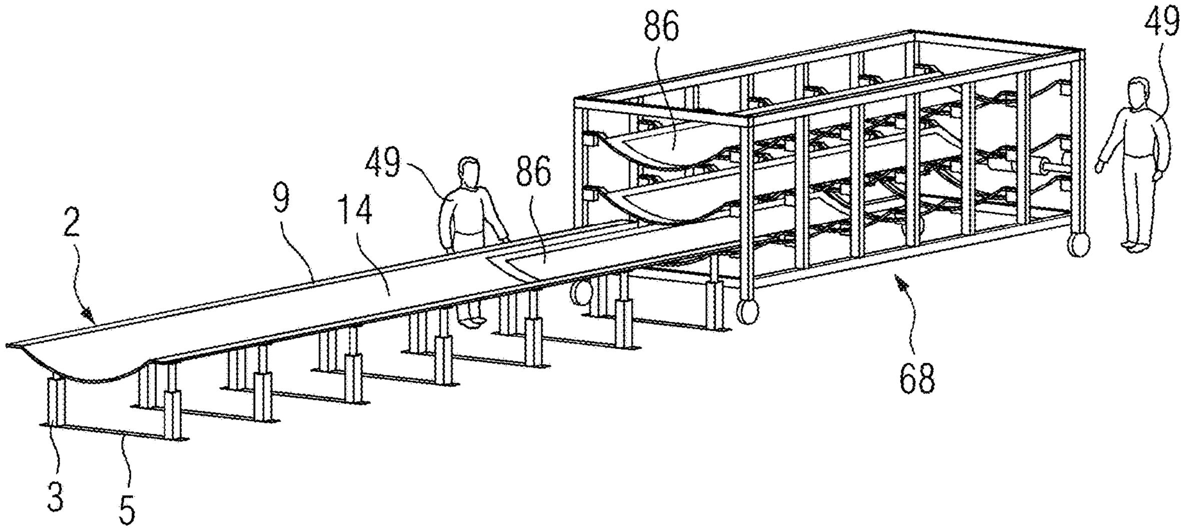
Figure 34:
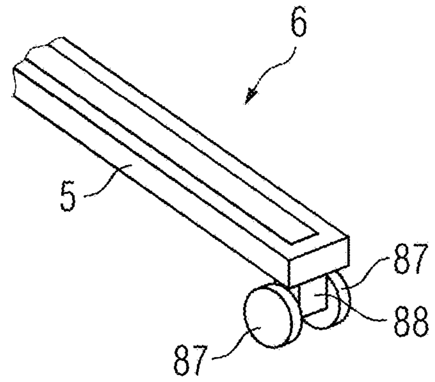

Other objects and features of the present invention will become apparent from the following detailed description considered in conjunction with the accompanying drawings. The drawings, however, are only principle sketches designed solely for the purpose of illustration and do not limit the invention. The drawings show:

FIG. 1 a perspective view of a manufacturing assembly using a first embodiment of a mold element support device in a first state, FIG. 2 the embodiment of FIG. 1 in a second state using a different mold element, FIG. 3 the embodiment of FIG. 1 in a third state using a third mold element, FIG. 4 the positioning of the first embodiment on the floor, FIG. 5 a second embodiment of a mold element support device in a first state, FIG. 6 the second embodiment in a second state, FIG. 7 a third embodiment of a mold element support device, FIG. 8 column elements having a swivel arm, FIG. 9 an exploded view of the column elements of FIG. 8, FIG. 10A-C a support portion interacting with different flange designs of a mold element, FIG. 11 a possible design of a support portion, FIG. 12 a manufacturing assembly having workstation platforms, FIG. 13 the manufacturing assembly of FIG. 12 with a first assistance device, FIG. 14 the manufacturing assembly of FIG. 12 with a second assistance device, FIG. 15 the manufacturing assembly of FIG. 12 with a third assistance device, FIG. 16 the manufacturing assembly of FIG. 12 with a fourth assistance device, FIG. 17 the manufacturing assembly of FIG. 12 with a fifth assistance device, FIG. 18 a first embodiment of a layer structure of a mold element, FIG. 19 a second embodiment of a layer structure of a mold element, FIG. 20 a third embodiment of a layer structure of a mold element, FIG. 21 a fourth embodiment of a layer structure of a mold element, FIG. 22 a fifth embodiment of a layer structure of a mold element, FIG. 23 a sixth embodiment of a layer structure of a mold element, FIG. 24 a view showing a transport and/or storage device for mold elements and a lifting means, FIG. 25 a second view showing a transport and/or storage device with a vacuum lifter as lifting means, FIG. 26 a view showing the placement of a mold element onto a mold element support device using a vacuum lifter, FIG. 27 a view showing a second embodiment of transport and/or storage device and lifting means to place a mold element onto a mold element support device, FIG. 28 placing a mold element onto a mold element support device by moving the second embodiment of the transport and/or storage device over the mold element support device, FIG. 29 a perspective view of the second embodiment of the transport and/or storage device, FIG. 30 a cut view of the second embodiment of the transport and/or storage device in a first state, FIG. 31 a cut view of the second embodiment of the transport and/or storage device in a second state, FIG. 32 a view showing removal of a preform element from the mold element, FIG. 33 a view showing usage of the second transport and/or storage device for removing a preform element, and FIG. 34 schematically an embodiment of a mold element support device having wheels.

FIG. 1 shows a manufacturing assembly 1 using a first embodiment of a mold element support device 2 according to the invention. The mold element support device 2 comprises a plurality of column elements 3 which are movable in a width direction 4 by being guided in rails 5 as part of a positioning device 6. The rails 5 are mounted or, in other embodiments, integrated into a floor 7 on which the mold element support device 2 is placed.

In the embodiment shown in FIGS. 1 to 3, a pair of two opposing column elements 3 is guided in a shared rail 5, but each of the column elements 3 is independently positionable in the width direction 4. In a longitudinal direction 8, a plurality of such pairs in shared rails 5 are consecutively placed such that a mold element 9 can be placed on support portions 10 of the column elements 3, as shown in FIG. 1 for a mold element 9 having a large width, such that the column elements 3 are positioned exemplarily at the outermost position of the shared rail 5 in width direction 4 to support flanges 11 of the mold element 9. The column elements 3 further comprise a height adjustment device 12, in this case a telescopic device, to be individually adjustable in a height direction 13. In the first embodiment shown in FIGS. 1 to 3, the column elements 3 fully extend in a vertical direction, comprising the height adjustment device 12 in a corresponding vertical extending column section, which can be prolonged or shortened by the height adjustment device 12, in this case by telescopically extending or retracting a cylindrical telescopic element. While this construction using a telescopic device will be shown through all the embodiments discussed here, of course, other embodiments of height adjustment devices are also conceivable, for example using a linear actuator, toothed rods and the like.

In the embodiments shown here, manufacturing assemblies for preform elements for a wind turbine blade are described; however, embodiments of the invention may also relate to other preform elements and/or precast elements and/or prepackaged elements.

To manufacture a preform element, the components of the preform element, for example comprising fiber mats, core materials and/or binding agents, are placed in the mold element 9 having a molding surface 14 defining a shape desired for the preform element. By placing the components on the molding surface 14, they assume the desired shape. The binding agent is supplied to locally attach the components together such that they can be handled as a single object, that is, the preform element. As will be further discussed later on, the binding agent may be activated by heat and hardened/cured by cooling, which can also already take place in the manufacturing assembly 1. Alternatively, an oven may be used. In many embodiments, the preform elements will be packed in a vacuum bag and/or vacuum foil for improved handling. A work station provided by the manufacturing assembly 1 may thus also be called packing station.

Due to the adjustability of the support portions 10 in height direction 13 and in width direction 4, enabled by the positioning device 6 and the height adjustment devices 12, the mold element support device 2 may be flexibly used for different shapes and/or sizes of mold elements 9, as further explained with respect to FIGS. 2 and 3.

In FIG. 2, a narrower mold element 9' is shown instead of the mold element 9. Here, the column elements 3 of the respective pairs in shared rails 5 have been moved closer together such that the flanges 11 can be supported on the respective column elements 3. If the molding surface 14 is flatter or deeper, the height can also be adjusted to provide optimal working conditions for manufacturing personnel.

In FIG. 3, a third mold element 9" has been placed on the mold element support device 2, which comprises a characteristic feature 15, for example with respect to a lightning protection system of the wind turbine blade to be manufactured from the preform elements. In the region of the feature 15, the flange 11 is located in a higher position and the mold element 9" is locally widened by a width 16. Different heights 17, 18 are also indicated in FIG. 3. By providing the positioning device 6, in this case the rails 5, and the height adjustment devices 12, the mold element support device 2 can be adjusted perfectly to support the flanges 11 along the whole length of the mold element 9".

The mold elements 9, 9', 9" are, of course, only exemplary and other mold elements may also be used, to which the mold element support device 2 can be adjusted.

FIG. 4 illustrates another feature of the mold element support device 2 of the first embodiment. The rails 5, which already form part of the positioning device 6, are releasably attachable to the floor 7 by attachment means 19, such that a pair of column elements 3 in or on a shared rail 5 can be moved in the longitudinal direction 8, as indicated by arrow 20. This allows additional adjustment in longitudinal direction 8 by removing pairs of column elements 3 in shared rails 5 or reductions of longitudinal distance between them.

Each pair of column elements 3 in or on a shared rail 5 forms a module of the modular mold element support device 2. These modules can easily be removed due to the attachment means 19 and be tightly stored as well as easily transported. Mold element support devices 2 can easily be extended or reduced by adding or removing modules. This further improves the flexibility and operability of the mold element support device 2. It is noted that this modular approach may preferably apply also to all further embodiments discussed below, in particular for additionally provided supporting column elements 3 in or on a shared rail 5, individual rails 5 for each column element and embodiments with swivel arms. This modularity can, in particular, be achieved by providing the attachment means 19. However, embodiments, in which the positioning device 6 additionally comprises wheels, which may be attached to the rails 5, in particular replacing or complementing the attachment means 19, can be provided. The wheels may have a locking device, in particular a brake, associated with them to fixate positioning of the rails 5.

FIG. 5 shows a second embodiment of a mold element support device 2 according to the invention. In this case, a dedicated rail 5 is associated with each column element 3, allowing, as shown in FIG. 6, shifted positioning in longitudinal direction 8 for associated column elements 3 of a pair.

FIG. 7 shows a third embodiment of a mold element support device 2. In this case, a pair of column elements 3 for supporting the flanges 11 of a mold element 9 are, again, guided by a shared rail 5. However, in or on each shared rail 5, an additional column element 3' is located between the column elements 3 of the pair to additionally support a middle section 21 of the mold element 9. This additionally prevents deflection and/or deformation of the mold element 9. The additional column element 3' is also movable in or on the rail 5 to be positioned at the lowest point of the mold element 9 at this length position.

Of course, such additional column elements 3' can also be supported in their own rails 5, in particular regarding the second embodiment of FIGS. 5 and 6.

In the previous embodiments, the column elements 3 have been shown as extending essentially vertical over their whole height. However, in preferred designs applicable to all three embodiments discussed above, the column elements 3 may also comprise a swivel arm 22, which may preferably be positioned on top of a vertical column section 23 of the column element 3 embodying the height adjustment device 12, in this case again configured as a telescopic device. The swivel arm 22 extends in a horizontal direction and is pivotable around a vertical pivot axis by providing a respective hinge 24, as indicated in the exploded view of FIG. 9, arrow 25. On its other end, the swivel arm 22 carries the support portion 10.

In FIG. 8, a pair of column elements 3 positioned at the same longitudinal position and opposingly in the width direction 4 are shown. A comparison between the dashed positions 26 and the fully-shown positions 27 of the swivel arm 22 and hence the lateral distances 28, 29 in width direction 4 clearly indicate the flexibility in width direction 4 provided by the swivel arms 22.

The swivel arms 22 hence form part of the positioning device 6 and can be used in addition to the rails 5, but also as an alternative. In the latter case, the attachment means 19 can be used to directly attach the column element 3 to the floor 7.

In the exploded view of FIG. 9, the design of the support portion 10 is also shown in more detail. As can be seen, the support portion 10 comprises a contact area 30, in this case a flat contact surface 31, for contacting the mold elements 9, 9', 9". A tilting device 32 is constituted by a ball joint 33, such that the contact surface 31 can be tilted from its horizontal position into a plurality of tilted orientations, as indicated by the arrows 34. The ball joint 33 or, in general, the tilting device 32, may also allow rotation of the contact area 30/contact surface 31, as indicated by arrow 35. This allows adjustability of the contact surface 31 and hence the whole support portion 10 to different designs of the flanges 11 of mold elements 9, 9', 9", as further illustrated in FIGS. 10A-10C. Here, different configurations of flanges 11, 11' and 11" are shown requiring tilting of the contact surface 31 by the tilting device 32. In particular, in FIGS. 10B and 10C, flanges 11' and 11" are shown having a shoulder 36 against which the contact area 30 of the support portion 10 may rest.

The contact surface 31/contact area 30 may comprise a low friction material, in particular to allow sliding of the mold elements 9, 9', 9" on the contact surface 31. In another embodiment, the contact area 30, as shown in FIG. 11, may comprise rollers 37, preferably oriented in width direction 4, to facilitate placement of the mold elements 9, 9', 9" on the support portion 10 of the mold element support device 2.

The features discussed with respect to FIGS. 9 to 11 are applicable to all embodiments of the mold element support device 2 according to the invention.

FIG. 12 illustrates a further embodiment of a mold element support device 2 of a manufacturing assembly 1 during use. This fourth embodiment is based on the first embodiment of FIGS. 1 to 3 and additionally comprises working platforms 38 extending longitudinally along both sides of the mold element 9. Both working platforms 38 are provided on top of a frame 39, which comprises height adjustment means 40, in this case a scissors mechanism 41, for the working platform 38. Hence, the working platform 38 is also height adjustable, as indicated by double arrow 42. A climbing means 43, in particular a stair or a ladder, is pivotably mounted to the working platform 38, which may further comprise a security fence 44.

The frame 39 with the working platform 38 may be guided in or on the shared rail 5, but is in this embodiment in any case coupled to the close column element 3 of at least one of the pairs using the shared rail 5. In this manner, the working platforms 38 are always positioned adjacent to these outermost column elements 3 and, hence, the mold element 9. The movability of the working platforms 38 in the width direction are indicated by arrows 45.

The mold element support device 2, in this manner, not only allows to adjust to different mold elements 9, 9', 9", but also to find an optimal working position regarding the width direction 4 and the height direction 13. In FIG. 12, a manufacturing step for a preform element is exemplarily illustrated. A vacuum foil 46 or other component of a vacuum bag has already been placed in the mold element 9. Components 47 of the preform element, in this case fiber mats 48, are currently added by manufacturing personnel 49.

FIG. 13 shows a further example, in particular a fifth embodiment of the mold element support device 2, which is based on the third embodiment of FIG. 7 and thus also has additional column elements 3' supporting the middle section 21 of the mold element 9. Since the working platforms 38 can be applied to each of the embodiments, FIG. 13 again shows two longitudinally extending working platforms 38 along the mold element 9. Here, the manufacturing assembly 1 additionally comprises an assistance device 50 for providing components 47, in this case fiber mats 48. The assistance device 50 comprises an overhang crane 51 having a pallet 52 on which the fiber mats 48 are provided. The assistance device 50 may be movable according to arrow 53 such that the manufacturing personnel 49 can easily access the fiber mats 48 on the pallet 52. If the height of the pallet 52 is not or only in a limited fashion height-adjustable, the height of the column elements 3 as well as the working platforms 38 can be adjusted to achieve optimal working conditions. Hence, the flexibility of the mold element support device 2 also applies to assistance devices 50.

While the overhang crane 51 in FIG. 13 is a transversal crane in the width direction 4, FIG. 14 shows an additional embodiment of a manufacturing assembly using an overhang crane 54 which is longitudinally oriented and can, for example, be movable in the width direction 4 to be used at parallelly extending manufacturing assemblies 1/mold elements 9.

In the example of FIG. 15, instead of an overhang crane, a gantry crane 55 is provided.

In the example of FIG. 16, no working platforms 38 are used, which may, in other embodiments, be provided nonetheless. In this case, a fiber laying machine 56 is used as assistance device 50, the fiber laying machine 56 comprising a cutter cutting the fiber mat 48 in the current length while laying it directly into the mold element 9, in particular onto the mold surface 14 already provided with the vacuum foil 46. A fiber material stock 57 can be placed near the mold element 9 so that the fiber laying machine 56 can be loaded separately or continuously.

FIG. 17 illustrates a further example, wherein a CNC-controlled fiber laying machine 58 is used so that the fiber material/fiber mat 48 is correctly positioned on the molding surface 14.

In particular in embodiments where a fiber laying machine 56, 58 is used, but also in other embodiments and with other assistance devices 50, the binding agent may be directly applied to the fiber mats 48.

The mold elements 9, 9', 9" may generally be made, or constructed, respectively, from a layer structure. Here, FIG. 18 shows a first embodiment of a layer structure 59 of a mold element 9, 9', 9". Here, a classical laminate 60 is used, which is relatively heavy and expensive, but allows heat transport through the layers of the laminate 60, such that heating or cooling through the mold element 9, 9', 9" is possible. In the second embodiment of a layer structure 59 shown in FIG. 19, a sandwich structure is used, in which a core material 61, in this case balsa wood, is sandwiched between outer layers 62 made of fiber glass. This is a cheap, strong and relatively light in weight variant, but provides less heat transfer through the layer structure 59.

In the third embodiment of a layer structure 59 of FIG. 20, an especially lightweight sandwich structure is used, where the core material 63 is a foam and the outer layers 62 are again based on carbon fibers.

In the especially advantageous fourth embodiment of FIG. 21, two core materials are sandwiched between the outer layers 62 in the layer structure 59, namely a first core layer 64, which may be a laminate stack, and a second additional layer 65 made from a material comprising internal channels and/or voids, for example ParaBeam™. The voids and/or internal channels may be used as cooling and/or heating channels, through which a cooling and/or heating fluid may be supplied to heat and/or cool the preform element from below.

FIG. 22 illustrates a fifth embodiment of a layer structure 59 for a mold element 9, 9', 9", wherein, in a sandwich structure, between the outer layers 62 made of carbon fibers, a core material 66 having a honeycomb structure is used to further reduce the weight.

In the sixth embodiment of FIG. 23, a 3D-printed form shell is used as the layer structure 59, preferably again comprising cooling and/or heating channels 67 for supplying cooling and/or heating fluid.

FIG. 24 illustrates a first manner to store and/or transport and move mold elements 9, 9', 9", 9''', for example when a mold element 9, 9', 9", 9''' is to be exchanged at a mold element support device 2. To this end, a transport and/or storage device 68 can be used, wherein FIG. 24 shows a first embodiment of such a transport and/or storage device 68. The transport and/or storage device 68 comprises a frame 69, on which vertical beams 70 are positioned having height-adjustable holders 71 mounted thereon to hold vertically positioned mold elements 9, 9', 9", 9''' in an upright position, that is, vertical orientation. To move a mold element 9, 9', 9", 9''' to and/or from the mold element support device 2, a lifting device 72, in FIG. 24 a crane 73 with grippers 89, can be employed.

An especially preferred embodiment is shown with respect to FIGS. 25 and 26. Here, a vacuum lifter 74 having a rotatable yoke 75 is used as lifting device 72, wherein the yoke 75 is rotatable such that, for placement of the vacuum-lifted mold element 9 of the support portions 10 of the mold element support device 2 the mold element 9 can be rotated from the vertical position shown in FIG. 25 into a horizontal orientation shown in FIG. 26.

It is also possible to actually transport and/or store the mold elements 9, 9', 9", 9''' in a horizontal orientation, as, for example, shown in FIGS. 27 to 33. Here, a different embodiment of a transport and/or storage device 68 is used, which will be described in detail later. Using an overhang crane 76 having a gripper 77, a mold element 9' can be pulled out from the transport and/or storage device 68 over the already adjusted mold element support device 2 and can then be lowered onto the support portions 10. In particular, mold elements 9, 9', 9", 9''' can also be slid onto the mold element support device 2, in particular if the contact surfaces 31 are of a low friction material and/or comprise rollers 37.

As shown in FIG. 28, alternatively, if the horizontal beams 78 of the transport and/or storage device 68 are removed, the transport and/or storage device 68 can even be moved over the mold element support device 2 such that the lowest mold element 9 can simply be lowered onto the support portions 10 of the column elements 3.

Generally, as shown in the partial view of FIG. 28, the transport and/or storage device in the second embodiment may also comprise a frame structure 79 comprising vertical beams 80. In the embodiment shown here, three groups of support elements 81 are mounted to the vertical beams 80, wherein, for each beam 80, the support element 81 of the first group is in the respective lowest position, the support element 81 of the second group in the middle position and the support element 81 of the third group in the uppermost position. The support elements all comprise swivel arms 82 to adjust for different widths of the mold elements 9, 9', 9", 9'''. Furthermore, all support elements 81 are height adjustable. If, now, as shown in FIG. 30, a mold element has been placed onto the group of uppermost support elements 81, the support elements 81 of the third group can be moved up to bring the mold element 9 into a respective transport and/or storage position. Here, again, the mold element 9 is supported on its flanges 11.

As shown in FIG. 31, the support elements 81 may be individually height-adjustable to provide for height differences 83, as shown for the mold element 9'''' supported by the second group of support elements 81 in FIG. 31. As already discussed with regard to the swivel arms 22, analogously, the swivel arms 82 allow adjustment to different widths 84, 85 as shown for the first and second group of support elements 81 in FIG. 31. Hence, the transport and/or storage device 68 of this embodiment can easily be adjusted for different shapes and/or sizes of mold elements 9, 9', 9", 9''', 9'''', comparable to the mold element support device 2.

Like or even the same transport and/or storage devices 68 can also be used for transport and/or storage of the preform elements manufactured. For example, as shown in FIG. 32, a transport and/or storage device 68 as described in EP 22174530.0 can be used. Here, it is also shown that the lifting devices used for mold elements 9, 9', 9", 9''', 9'''' can also be used for lifting manufactured or at least packed preform elements 86 from the molding surface 14 to the transport and/or storage device 68.

As shown in FIG. 33, most preferably, the transport and/or storage device 68 already described with respect to FIGS. 27 to 29 may also be used for preform elements 86, for example, by sliding the preform element 86 from the mold element 9 and its molding surface 14 onto the support elements 81 already adjusted regarding the shape and size of the preform element 86.

Finally, FIG. 34 shows that, instead of or additional to attachment means 19, wheels 87 may also be mounted to rails 5 to form an easily positionable module. A locking device 88, in particular a brake, can be provided associated with the wheels 87 to fixate a position.

Although the present invention has been described in detail with reference to the preferred embodiment, the present invention is not limited by the disclosed examples from which the skilled person is able to derive other variations without departing from the scope of the invention.

The invention claimed is:

1. Mold element support device (2) for a manufacturing assembly (1) for preform elements (86) and/or precast elements and/or prepackaged elements, in particular for a wind turbine blade, the mold element support device (2) comprising multiple vertical column elements (3, 3') which comprise an upper support portion (10) for carrying a longitudinal mold element (9, 9', 9'', 9''', 9'''') for manufacturing a preform element (86) and/or a precast element and/or a prepackaged element, characterized in that the column elements (3, 3') comprise a height adjustment device (12) to, in particular individually, adjust the height of the column elements (3, 3'), and the support portions (10) are distance-adjustable at least in a width direction (4) of the mold element (9, 9', 9'', 9''', 9'''') via a positioning device (6), to adapt the mold element support device (2) to differently shaped and/or sized mold elements (9, 9', 9'', 9''', 9'''').

2. Mold element support device according to claim 1, characterized in that each height adjustment device (12) comprises a telescopic device and/or a controllable, in particular electric and/or hydraulic, actuator.

3. Mold element support device according to claim 1, characterized in that the positioning device (6) comprises rails (5) extending in the width direction (4), wherein the column elements (3, 3') are movably guided.

4. Mold element support device according to claim 3, characterized in that a pair of column elements (3) to be placed at opposite side edges of the mold element (9, 9', 9'', 9''', 9''''), in particular for supporting opposite flanges (11, 11', 11'') of the mold element (9, 9', 9'', 9''', 9''''), is guided in a shared rail (5).

5. Mold element support device according to claim 4, characterized in that at least one, in particular lower, additional column element (3') is located between the column elements (3) of the pair and guided in or on the shared rail (5) to additionally support a middle section (21) of the mold element (9, 9', 9'', 9''', 9'''').

6. Mold element support device according to claim 1, characterized in that the positioning device (6) comprises attachment means (19) for releasably mounting the column elements (3, 3') to a floor (7) and/or the positioning device (6) comprises wheels (87).

7. Mold element support device according to claim 1, characterized in that each column element (3, 3') comprises, as part of the positioning device (6), a horizontally extending swivel arm (22).

8. Mold element support device according to claim 7, characterized in that the swivel arm (22) is mounted on top of a vertical column section (23) of the column element (3, 3') and/or carrying the support portion (10).

9. Mold element support device according to claim 1, characterized in that the support portion (10) comprises an, in particular flat, contact surface (31) for contacting the mold element (9, 9', 9'', 9''', 9'''') and a tilting device (32), in particular a ball joint (33), for tilting the contact surface (31) into different contact orientations.

10. Mold element support device according to claim 1, characterized in that the support portion (10) comprises a low friction material and/or, in particular longitudinally oriented, rollers (37) in a contact area (30) to the mold element (9, 9', 9'', 9''', 9'''').

11. Mold element support device according to claim 1, characterized in that it further comprises at least one longitudinal working platform (38) for manufacturing personnel (49) to be placed longitudinally along the mold element (9, 9', 9'', 9''', 9''''), wherein the positioning device (6) is additionally adapted to, at least partly, position the working platform (38).

12. Mold element support device according to claim 11, characterized in that, if the positioning device (6) comprises at least one rail (5) extending in the width direction (4), the at least one working platform (38) is also guided in or on at least one of the at least one rail (5) and/or motion-coupled to an outermost column element (3) in the width direction (4) guided in or on the rail (5).

13. Mold element support device according to claim 11, characterized in that it further comprises a height adjustment means (40), in particular a telescopic means and/or a scissors mechanism (41), for the working platform (38).

14. Manufacturing assembly (1) for preform elements (86) and/or precast elements and/or prepackaged elements, comprising a mold element support device (2) according to claim 1 and a mold element (9, 9', 9'', 9''', 9'''') supported on the mold element support device (2).

15. Manufacturing system for preform elements (86) and/or precast elements and/or prepackaged elements, comprising at least one mold element support device (2) according to claim 1 and multiple, exchangeable mold elements (9, 9', 9'', 9''', 9'''') supportable on the mold element support device (2).

* * * * *